United States Patent
Verma et al.

(10) Patent No.: US 12,192,176 B2
(45) Date of Patent: Jan. 7, 2025

(54) CLOUD BASED PLATFORM TO EFFICIENTLY MANAGE FIREWALL RULES AND DATA TRAFFIC

(71) Applicant: Honeywell International Inc., Charlotte, NC (US)

(72) Inventors: Ajay Verma, Cumming, GA (US); Amod Kamat, Glen Allen, VA (US); William Smith, South Chesterfield, VA (US); Daniel P. Giorgis, Glen Allen, VA (US); Hugh Eaves, Richmond, VA (US); Michael Smith, Henrico, VA (US); Patrick Sager, Midlothian, VA (US); Upender Paravastu, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 179 days.

(21) Appl. No.: 17/938,697

(22) Filed: Oct. 7, 2022

(65) Prior Publication Data
US 2023/0124136 A1   Apr. 20, 2023

(30) Foreign Application Priority Data
Oct. 18, 2021  (IN) .............................. 202111047067

(51) Int. Cl.
*H04L 9/40* (2022.01)
(52) U.S. Cl.
CPC ...... *H04L 63/0263* (2013.01); *H04L 63/0823* (2013.01); *H04L 63/20* (2013.01)

(58) Field of Classification Search
CPC ............ H04L 63/0263; H04L 63/0823; H04L 63/20
See application file for complete search history.

(56) References Cited

PUBLICATIONS

Barker et al. (Guide to IPsec VPNs, NIST Special Publication 800-77 Revision 1, Jun. 2020, 166 pages) (Year: 2020).*
Check Point (Check Point 1100/1200R/1400 Appliances Locally Managed Models: L-50, L-50D, L-50W, L-50WD, L-61i, L-71, L-71W, L-72, L-72W, L-72P R77.20.60, 2017, 176 pages) (Year: 2017).*
Elatov (Creating an IPSec Tunnel between Google CloudPlatform and PFSense, Jan. 2019, 13 pages) (Year: 2019).*

* cited by examiner

*Primary Examiner* — Oleg Korsak
(74) *Attorney, Agent, or Firm* — ALSTON & BIRD LLP

(57) ABSTRACT

Various embodiments described herein relate to a virtual network with a cloud-based server, cloud-based firewall and a cloud-based service. The cloud-based server is in communication with a client installed on a gateway to receive an encapsulated IP data packet from one or more applications installed on the gateway. The cloud-based configured to decapsulate the encapsulated IP data packet verify a security certificate based on a first information and configure a cloud-based firewall based on a second information. The cloud-based server is configured to route the one or more IP data packets to the cloud-based firewall for processing each IP data packet based on the second information. In response to the one or more IP data packets being compliant with the first information provided to authenticate the gateway and the second information provided to configure the cloud-based firewall, routing the one or more IP data packets to the cloud-based service.

20 Claims, 12 Drawing Sheets

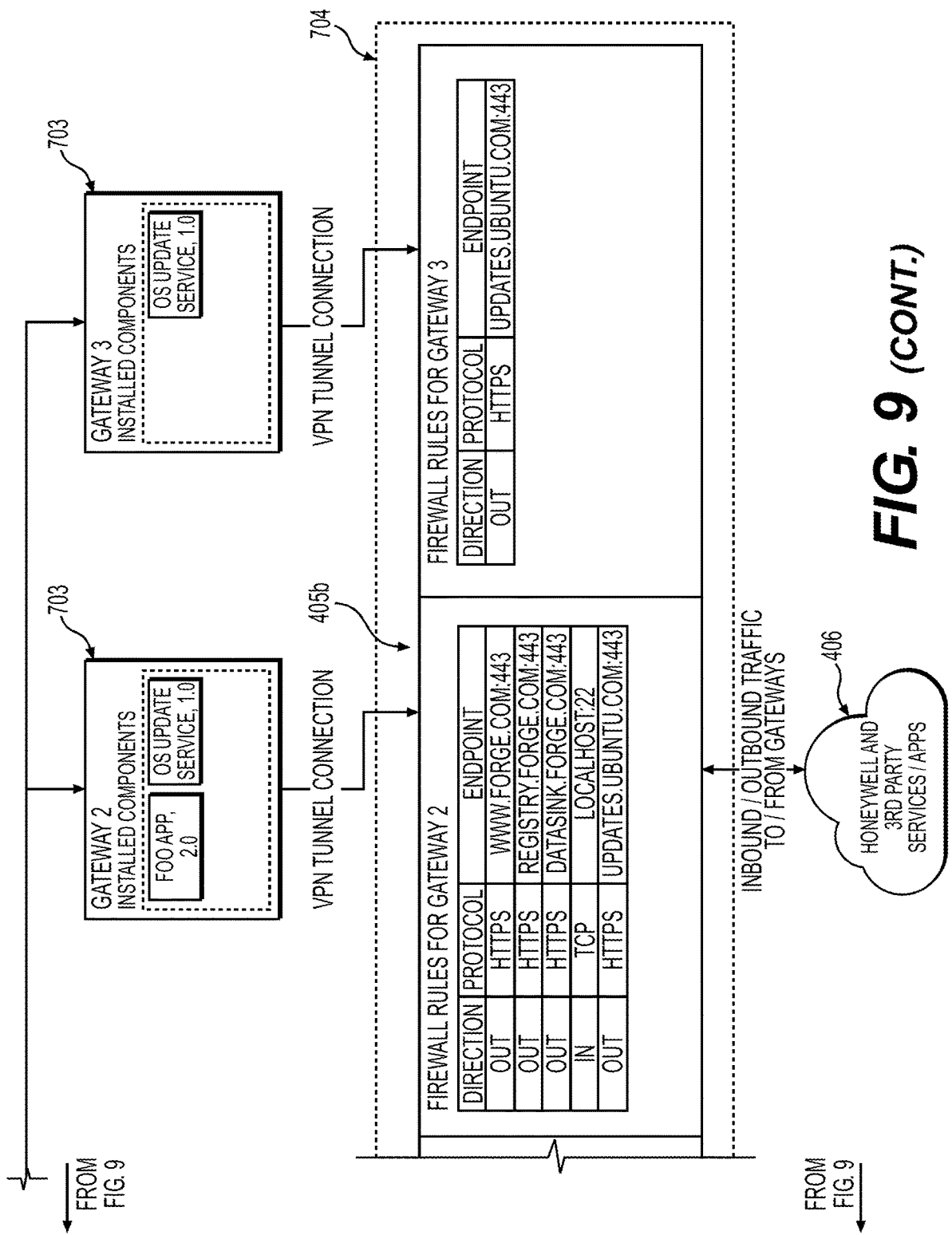

CLOUD BASED PLATFORM TO EFFICIENTLY MANAGE FIREWALL RULES AND DATA TRAFFIC

TECHNICAL FIELD

The present disclosure relates generally to a cloud-based platform, and more particularly to a software service used in conjunction with the cloud-based platform to manage firewall rules and data traffic.

BACKGROUND

Various industries include a large amount of assets, such as interconnected devices and/or equipment at one or multiple asset sites, such as industrial plants, warehouses, and/or buildings. Generally, enterprise applications are used with these assets are configured to communicate with applications or services within an IoT (Internet of Things) platform by means of gateways. Typically, to access the applications or services, the enterprise applications requesting the access may have to go through a firewall system maintained by the organization. A traditional firewall system in enterprise network environments typically provides access to these enterprise applications based on the security policy programmed on this firewall. Accordingly, each enterprise application based on the asset associated with it and based on the type of service access requested, the security policy may be programmed on this firewall. In this regard, while a new enterprise application outside of the enterprise network environment attempts to communicate with the IoT platform, the firewall security policy may be re-programmed to allow the access. In this regard, the communication traffic (i.e., data packets requesting the access) from each of the assets may have to pass through the firewall before accessing applications or services within the IoT platform. Several disadvantages have been noticed in deployment of security policies in the firewall for each of the enterprise applications while organization implement the applications in a cloud computing environment either private or public. For example, onboarding a new asset form a new vendor in the enterprise network environment can be technically challenging as the security policy must be re-programmed or a URL for the new vendor must be added to the security policy, etc. Further, if the existing vendor of an asset in the enterprise network environment has altered the URL, then the communication may fail because the security policy is not updated with the altered URL. Further, it may be a cumbersome task for the gateways to handle the traffic from the applications as the firewall maintains and checks the security policies per vendor basis which may also ultimately increase the URLs to be handled by the firewall of the organization. Through applied effort, ingenuity, and innovation, many of the identified technical problems have been solved by developing solutions that are included in embodiments of the present disclosure, many examples of which are described in detail herein.

BRIEF SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a method for routing IP data packets to a cloud-based service. The method includes receiving an encapsulated IP data packet from one or more applications installed on a gateway device. The one or more applications request access to the cloud-based service. The method further includes decapsulating the encapsulated IP data packet from the gateway device to retrieve one or more IP data packets wrapped within the encapsulated IP data packet and verifying a security certificate of the gateway device based on a first information from at least one of the one or more IP data packets. The method further includes configuring a cloud-based firewall based on a second information from the one or more applications and routing the one or more IP data packets to the cloud-based firewall for processing each IP data packet based on the second information. In response to the one or more IP data packets being compliant with the first information provided to authenticate the gateway device and the second information provided to configure the cloud-based firewall, routing the one or more IP data packets via a cloud communication network protocol to the cloud-based service.

Various example embodiments described herein relate to a method for routing IP data packets to a cloud-based service, wherein the first information is a request for a valid, new or updated identity certificates for the gateway device which is wrapped as a part of the encapsulated IP data packet.

Various example embodiments described herein relate to a method for routing IP data packets to a cloud-based service, wherein the second information is indicative of the firewall rules/policies for each application or the gateway device.

Various example embodiments described herein relate to a method for routing IP data packets to a cloud-based service. The method further includes routing the first information to a virtual admin portal to retrieve the security certificate of the gateway device.

Various example embodiments described herein relate to a method for routing IP data packets to a cloud-based service. The method further includes automatically revoking a previously issued security certificate when a new security certificate is issued by the virtual admin portal.

Various example embodiments described herein relate to a method for routing IP data packets to a cloud-based service. The method further includes retrieving a client configuration in response to the first information, wherein the first information is indicative of a new gateway device connected to the cloud server.

Various example embodiments described herein relate to a virtual cloud-based networking platform. The virtual cloud-based networking platform includes a cloud-based admin portal to manage a set of security services for gateway devices, a virtual database, and one or more cloud-based servers with one or more processors communicably connected to the cloud-based admin portal and the virtual database. The one or more processors configured to: receive an encapsulated data packet from a gateway device installed in an organization network. The organization network comprises one or more hardware devices and applications transmitting one or more data packets to the gateway device. The one or more data packets comprise a request to access one or more cloud-based services. The one or more processors further configured to: decapsulate the encapsulated data packet from the gateway device to retrieve the one or more data packets wrapped within the encapsulated data packet and verify a security certificate of the gateway device by accessing the cloud-based admin portal. The security certificate is issued by the cloud-based admin portal to validate an identity of a client on the gateway device. The one or more processors further configured to: configure a cloud-based firewall based on a second information hosted by the virtual database and process the one or more data packets based on the second information. In response to the one or more data packets being compliant with the second information, route the one or more data packets via a cloud communication network protocol to the one or more cloud-based service.

Various example embodiments described herein relate to a virtual cloud-based networking platform, wherein the security certificate is one of a Bootstrap certificate or a OpenVPN certificate issued for a one of a new OpenVPN client or an existing OpenVPN client installed on the gateway device.

Various example embodiments described herein relate to a virtual cloud-based networking platform, wherein the second information is indicative of the network rules/policies for each application or the gateway device.

Various example embodiments described herein relate to a virtual cloud-based networking platform, wherein the second information is one of embedded as an additional file in the one or more applications or stored in the form of lookup tables in the virtual database.

Various example embodiments described herein relate to a virtual cloud-based networking platform, wherein the cloud-based admin portal comprises a firewall Configuration Service hosted as an application programming interface (API) through which the firewall rules or policies are administered by the cloud-based admin portal.

Various example embodiments described herein relate to a system with a virtual client and a virtual server. The virtual client includes one or more processors communicably connected to a virtual server. The one or more processors configured to: receive one or more data packets from one or more applications installed on a gateway device installed in an organization network. The organization network comprises one or more hardware devices and applications transmitting one or more data packets. The one or more data packets comprise a request to access one or more cloud-based services. The one or more processors configured to: encapsulate the one or more data packets into an encapsulated data packet and route the encapsulated data packet through a virtual tunnel interface to the virtual server. The virtual server with one or more processors communicably connected to the cloud-based admin portal and a virtual database. The one or more processors configured to: receive the encapsulated data packet from the virtual client through the virtual tunnel interface in a data format compatible with a cloud-based firewall and decapsulate the encapsulated data packet to retrieve the one or more data packets wrapped within the encapsulated data packet. The one or more processors further configured to: verify a security certificate of the gateway device by accessing the cloud-based admin portal. The security certificate is issued by the cloud-based admin portal to validate an identity of the virtual client on the gateway device. The one or more processors further configured to: configure the cloud-based firewall based on a second information hosted by the virtual database and process the one or more data packets based on the second information. In response to the one or more data packets being compliant with the second information, route the one or more data packets via a cloud communication network protocol to the one or more cloud-based service.

Various example embodiments described herein relate to a system, which further includes a Domain Name System (DNS) server configured to maintain a track of IP address of the gateway device with a hostname and a destination IP address of the cloud-based service requested by each application on the gateway device.

Various example embodiments described herein relate to a system, which further includes an organization's firewall configured with a single firewall exception in the form of a URL to redirect the encapsulated data packet to the virtual server.

Various example embodiments described herein relate to a system, wherein the virtual tunnel interface communicates the encapsulated data packet to the virtual server through one of a TLS-over-TCP connection or HTTP connection.

Various example embodiments described herein relate to a gateway device installed in a networking environment. The gateway device includes a first client to route a first data traffic from one or more applications installed at the gateway device to a data packet wrapper. The first data traffic is indicative of a request to access one or more cloud services. The gateway device further includes a second client to route a second data traffic to the data packet wrapper. The second traffic is indicative of a request for one of new or updated security certificates for the first client. The gateway device further includes the data packet wrapper to encapsulates the first data traffic and the second data traffic into a single data packet and a user defined tunnel to communicate the single data packet to a cloud-based server in a protocol compatible with a cloud-based firewall, wherein the single data packet is communicated to the cloud-based server through one of a TLS-over-TCP connection or HTTP connection.

Various example embodiments described herein relate to a gateway device, wherein the first client is an Open VPN client and the second client is a Simple Connect client.

Various example embodiments described herein relate to a gateway device, wherein the protocol compatible with the cloud-based firewall is a TLS protocol.

Various example embodiments described herein relate to a gateway device, wherein the user defined tunnel is an OpenVPN tunnel.

Various example embodiments described herein relate to a gateway device, wherein an IP address of the single data packet is modified using a network address translation (NAT).

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
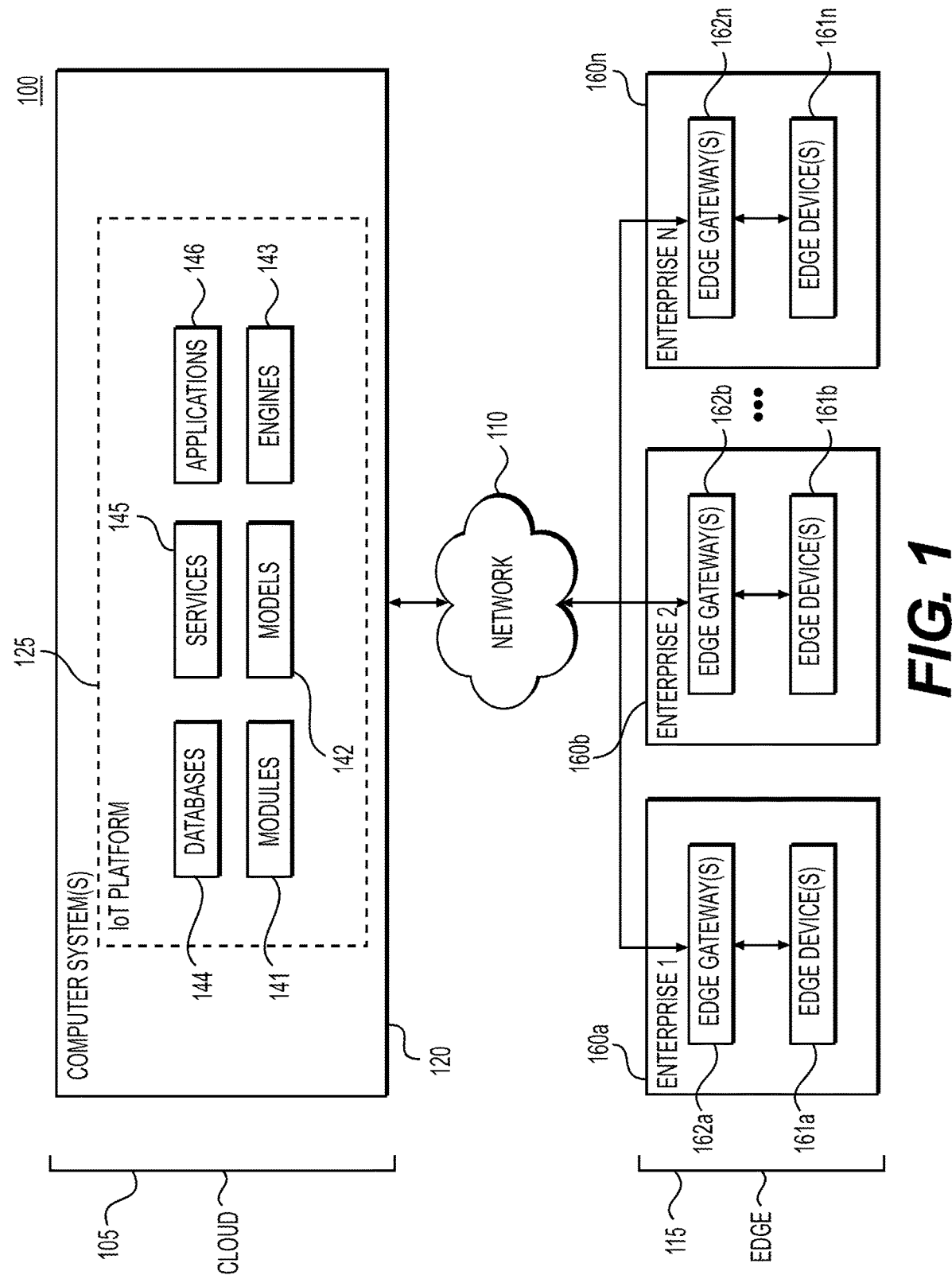
FIG. 1 illustrates an exemplary networked computing system environment, according to one or more embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. The word "exemplary" is used herein to mean "serving as an example, instance, or illustration." Any implementation described herein as "exemplary" is not necessarily to be construed as preferred or advantageous over other implementations. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure and can be included in more than one embodiment of the present disclosure (importantly, such phrases do not necessarily refer to the same embodiment).

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

As discussed previously, there exists a need for a new connectivity system, provisioned and controlled by a third-party cloud platform, without using the organizations' firewall while establishing a secure communication between the applications and the cloud services. The new connectivity system may tunnel the traffic from all the enterprise applications through one common channel and implement the firewall policies at the cloud platform instead of the organizations' firewall. In other words, the new connectivity system may build a virtual cloud-based firewall over the organizations' firewall with which all incoming data packets from the enterprise application and the cloud service being re-directed to the virtual cloud-based firewall. For example, the organizations' firewall may use only URL defined in the security policy which will redirect the packets to the virtual cloud-based firewall. In order to securely tunnel the data packets to the cloud-based firewall, the connectivity system uses a VPN (virtual private network) connection by using a VPN client and a VPN server which tunnels the data packets via virtual network interface obviating the requirement of individual connections of the enterprise applications to the organizations' firewall. In this regard, the connectivity system establishes a virtual cloud-based platform to centrally manage the firewall policies and effectively consolidate the network traffic without undue burden on the enterprise network and the gateways.

In various embodiments described herein, the new connectivity system may be referred to as a Virtual System with Virtual VPN client residing on the gateways. The gateways, for example, may be Honeywell Forge Connect Gateway devices. The data packets from the enterprise applications may be collected and encapsulated by the Virtual VPN client. The data packets may be routed to the Virtual VPN server via a single connection URL on the organizations' firewall. The single connection URL, for example, may be "https://simplyconnect.honeywell.com". The Virtual VPN server being in a cloud-based platform includes a Virtual firewall to centrally manage firewall rules to restrict inbound and outbound network access to each gateway devices. The VPN server decapsulates the encapsulated data packets and forwards them to appropriate services in the cloud. The data packets may be channeled through a virtual network interface assigned to the VPN tunnel and communicated using HTTP Streaming.

In various embodiments described herein, the VPN tunnel is a firewall compatible tunnel provided both on the VPN client side and the VPN server side. The VPN tunnel communicates the data packets wrapped at the client side in a cloud firewall compatible protocol before the data packets are forwarded to the VPN server. The VPN tunnel at the VPN server side may unwrap the data packets before the data packets are forwarded to the cloud firewall.

In various embodiments described herein, the VPN client may employ internal addressing techniques to encapsulate the data packets and forward the data packets to the VPN server. The data packets may be routed by the VPN server to the destination service by decapsulating the data packets.

In various embodiments described herein, the VPN server includes a Domain Name Server (DNS) to provide a lookup of private addresses of the VPN client. The addresses are associated with a hostname. The DNS sever may be utilized to maintain a track of current addresses of the VPN client when the client connects to the network after a temporary disconnection. The DNS server may be accessed to route the data packets from the destination service to the VPN client based on the lookup.

In various embodiments described herein, the VPN server is communicably connected to a virtual admin network. The virtual admin network manages firewall configuration, VPN client configuration, and certificate services.

In various embodiments described herein, the Simple connect gateway uses a network address translation (NAT) functionality to modify the gateway IP address provided in the data packet. The NAT address uses a range of addresses which are unique to each VPN client. The NAT addresses may be used at the VPN server to identify the destination address requested by the application. The data packet is then forwarded to the destination service based on the destination address.

In various embodiments described herein, the VPN client may access firewall policies when a new gateway is installed. The VPN client may access the firewall policies by connecting to an external rule database or by monitoring the applications running on the gateway. The applications may include additional files reciting the firewall policies. The VPN client may read the additional files. The cloud firewall on the VPN server may be updated with the firewall policies accessed or read by the VPN client. In this regard, the VPN client may automatically update or modify the firewall policies of the cloud firewall whenever a new gateway is installed in the enterprise network environment obviating the need of manual entry of the firewall policies by an IT administrator.

Throughout the specification, the terms "client", "virtual client", "VPN client", "OpenVPN client" may be used interchangeably to refer to a client computing system installed or provisioned at the organization's network environment.

Throughout the specification, the terms "server", "VPN server", "OpenVPN server" may be used interchangeably to refer to a server computing system installed or provisioned in the virtual network or cloud network.

Throughout the specification, the terms "virtual server", "cloud-based server", "cloud server" may be used interchangeably to refer to a computing system provisioned in the virtual network or cloud network.

Throughout the specification, the terms "organization firewall", "customer firewall", "physical firewall" may be used interchangeably to refer to a firewall maintained by an organization or a customer.

Throughout the specification, the terms "cloud-based firewall", "cloud firewall", "server-side firewall" may be used interchangeably to refer to a virtual firewall maintained by a third-party cloud service provider or the organization.

Throughout the specification, the terms "tunnel" or "VPN tunnel" may be used interchangeably to refer to a virtual interface through which the IP data packets may be communicated using a VPN protocol.

Throughout the specification, the terms "user defined tunnel" or "WebSocket tunnel" may be used interchangeably to refer to a virtual interface through which the IP data packets may be communicated using a protocol with the virtual firewall. It is understood than the "VPN tunnel" may be modified to be used as the "user defined tunnel" or vice-versa.

Throughout the specification, the terms "virtual admin portal" or "admin portal" may be used interchangeably to refer to a web application with a user interface external to the cloud server.

FIG. 1 illustrates an exemplary networked computing system environment 100, according to the present disclosure. As shown in FIG. 1, networked computing system environment 100 is organized into a plurality of layers including a cloud layer 105, a network layer 110, and an edge layer 115. As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, the network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/or virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or entity that includes any number of local devices.

Figure 2:
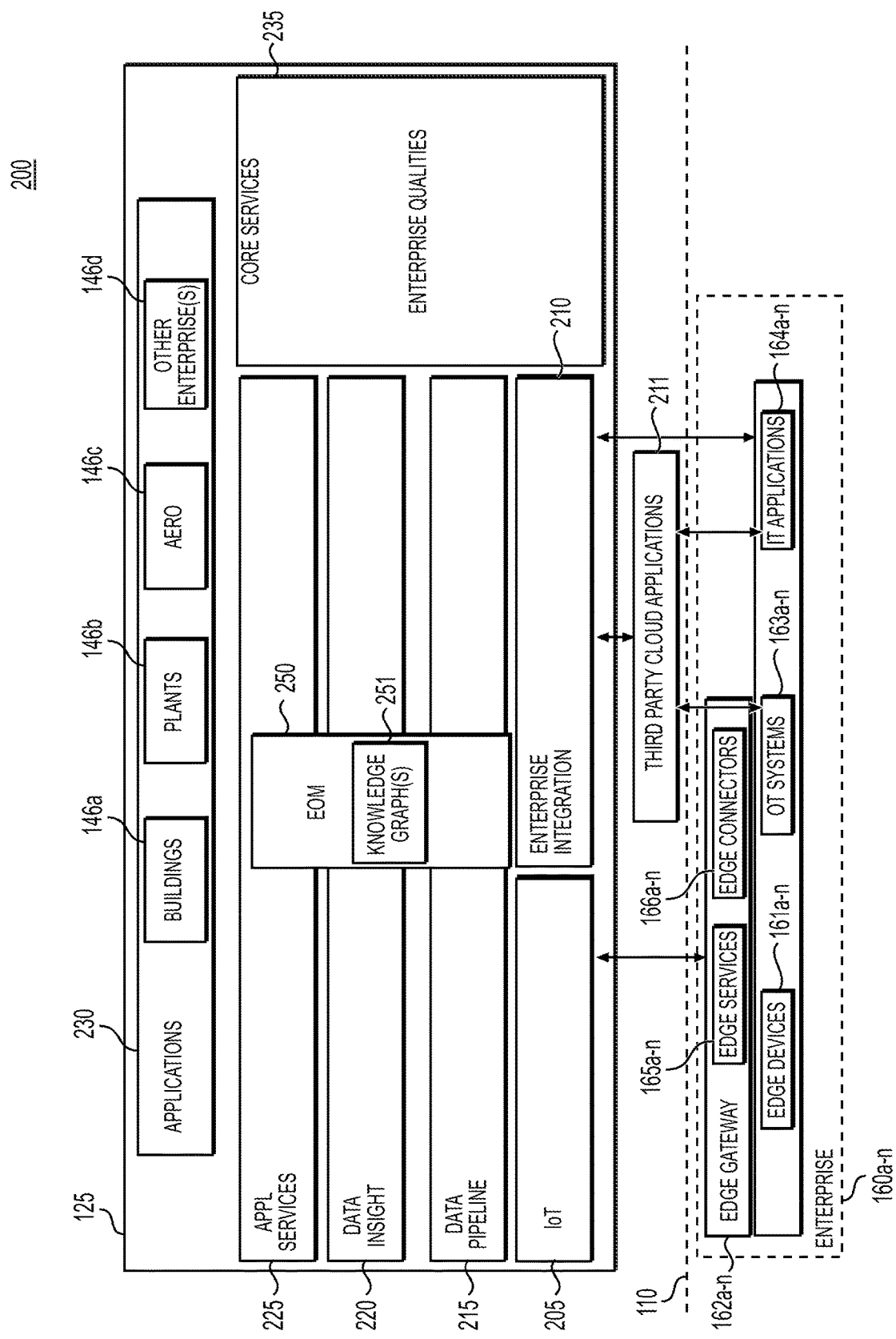
FIG. 2 illustrates a schematic block diagram of a framework of an Internet of Things (IoT) platform of the networked computing system environment of FIG. 1.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include assets, sensors, actuators, processors, computers, valves, pumps, ducts, vehicle components, cameras, displays, doors, windows, security components, boilers, chillers, pumps, HVAC components, factory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, Wi-Fi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication is achieved with the edge devices 161a-161n and/or the network 110 through wireless communication (e.g., Wi-Fi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, each layer 205-235 may include one or more of the modules 141, models 142, engines 143, databases 144, services 145, applications 146, or combinations thereof. In some embodiments, the layers 205-235 may be combined to form fewer layers. In some embodiments, some of the layers 205-235 may be separated into separate, more numerous layers. In some embodiments, some of the layers 205-235 may be removed while others may be added.

The IoT platform 125 is a model-driven architecture. Thus, the extensible object model 250 communicates with each layer 205-230 to contextualize site data of the enterprise 160a-160n using an extensible object model (or "asset model") and knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 may include resource description framework (RDF) graphs. As used herein, a "RDF graph" is a graph data model that formally describes the semantics, or meaning, of information. The RDF graph can also represent metadata (e.g., data that describes data). Knowledge graphs 251 can also include a semantic object model. The semantic object model is a subset of a knowledge graph 251 that defines semantics for the knowledge graph 251. For example, the semantic object model defines the schema for the knowledge graph 251.

As used herein, EOM 250 is a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, the model can describe the type of sensors mounted on any given asset (e.g., edge device 161a-161n) and the type of data that is being sensed by each sensor. A key performance indicator (KPI) framework can be used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 can understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 250 can automatically map the tag to the attribute based on naming conventions, parsing, and matching the tag and attribute descriptions and/or by comparing the behavior of the time series data with expected behavior.

The modeling phase includes an onboarding process for syncing the models between the edge 115 and the cloud 105. For example, the onboarding process can include a simple onboarding process, a complex onboarding process, and/or a standardized rollout process. The simple onboarding process includes the knowledge graph 250 receiving raw model data from the edge 115 and running context discovery algorithms to generate the model. The context discovery algorithms read the context of the edge naming conventions of the edge devices 161a-161n and determine what the naming conventions refer to. For example, the knowledge graph 250 can receive "TMP" during the modeling phase and determine that "TMP" relates to "temperature." The generated models are then published. The complex onboarding process includes the knowledge graph 250 receiving the raw model data, receiving point history data, and receiving site survey data. The knowledge graph 250 can then use these inputs to run the context discovery algorithms. The generated models can be edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, data can be ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT platform 205. In some embodiments, only authorized data is sent to the IoT platform 125, and the IoT platform 125 only accepts data from authorized edge gateways 162a-162n and/or edge devices 161a-161n. Data may be sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. The IoT layer 205 may also include components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third-party applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, the data pipeline layer 215 can pre-process and/or perform initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. The enterprise-specific digital twins can include a reliability advisor containing process models to determine the current operation and the fault models to trigger any early detection and determine an appropriate resolution. The digital twins can also include an optimization advisor that integrates real-time economic data with real-time process data, selects the right feed for a process, and determines optimal process conditions and product yields.

The data pipeline layer 215 may also use models and templates to define calculations and analytics and define how the calculations and analytics relate to the assets (e.g., the edge devices 161a-161n). For example, a pump template can define pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. The actual calculation or analytic logic may be defined in the template or it may be referenced. Thus, the calculation model can be used to describe and control the execution of a variety of different process models. Calculation templates can be linked with the asset templates such that when an asset (e.g., edge device 161a-161n) instance is created, any associated calculation instances are also created with their input and output parameters linked to the appropriate attributes of the asset (e.g., edge device 161a-161n).

The IoT platform 125 can support a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, the IoT platform 125 can drill down from a high-level condition to understand the contributing factors, as well as determining the potential impact a lower-level condition may have. There may be multiple fault models for a given enterprise 160a-160n looking at different aspects such as process, equipment, control, and/or operations. Each fault model can identify issues and opportunities in their domain and can also look at the same core problem from a different perspective. An overall fault model can be layered on top to synthesize the different perspectives from each fault model into an overall assessment of the situation and point to the true root cause.

When a fault or opportunity is identified, the IoT platform 125 can make recommendations about the best corrective actions to take. Initially, the recommendations are based on expert knowledge that has been pre-programmed into the system by process and equipment experts. A recommendation services module presents this information in a consistent way regardless of source, and supports workflows to track, close out, and document the recommendation follow-up. The recommendation follow-up can be used to improve the overall knowledge of the system over time as existing recommendations are validated (or not) or new cause and effect relationships are learned by users and/or analytics.

The models can be used to accurately predict what will occur before it occurs and interpret the status of the installed base. Thus, the IoT platform 125 enables operators to quickly initiate maintenance measures when irregularities occur. The digital twin architecture of the IoT platform 125 can use a variety of modeling techniques. The modeling techniques can include, for example, rigorous models, fault detection and diagnostics (FDD), descriptive models, predictive maintenance, prescriptive maintenance, process optimization, and/or any other modeling technique.

The rigorous models can be converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. The descriptive models identify a problem and then the predictive models can determine possible damage levels and maintenance options. The descriptive models can include models for defining the operating windows for the edge devices 161a-161n.

Predictive maintenance includes predictive analytics models developed based on rigorous models and statistic models, such as, for example, principal component analysis (PCA) and partial least square (PLS). Machine learning methods can be applied to train models for fault prediction. Predictive maintenance can leverage FDD-based algorithms to continuously monitor individual control and equipment performance. Predictive modeling is then applied to a selected condition indicator that deteriorates in time. Prescriptive maintenance includes determining what is the best maintenance option and when it should be performed based on actual conditions rather than time-based maintenance schedule. Prescriptive analysis can select the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. When raw data is received at the IoT platform 125, the raw data can be stored as time series tags or events in warm storage (e.g., in a TSDB) to support interactive queries and to cold storage for archive purposes. Data can further be sent to the data lakes for offline analytics development. The data pipeline layer 215 can access the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146a-d. The applications layer 230 includes one or more applications 146a-d of the IoT platform 125. For example, the applications 146a-d can include a buildings application 146a, a plants application 146b, an aero application 146c, and other enterprise applications 146d. The applications 146 can include general applications 146 for portfolio management, asset management, autonomous control, and/or any other custom applications. Portfolio management can include the KPI framework and a flexible user interface (UI) builder. Asset management can include asset performance and asset health. Autonomous control can include energy optimization and predictive maintenance. As detailed above, the general applications 146 can be extensible such that each application 146 can be configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. The core services 235 can include data visualization, data analytics tools, security, scaling, and monitoring. The core services 235 can also include services for tenant provisioning, single login/common portal, self-service admin, UI library/UI tiles, identity/access/entitlements, logging/monitoring, usage metering, API gateway/dev portal, and the IoT platform 125 streams.

Figure 3:
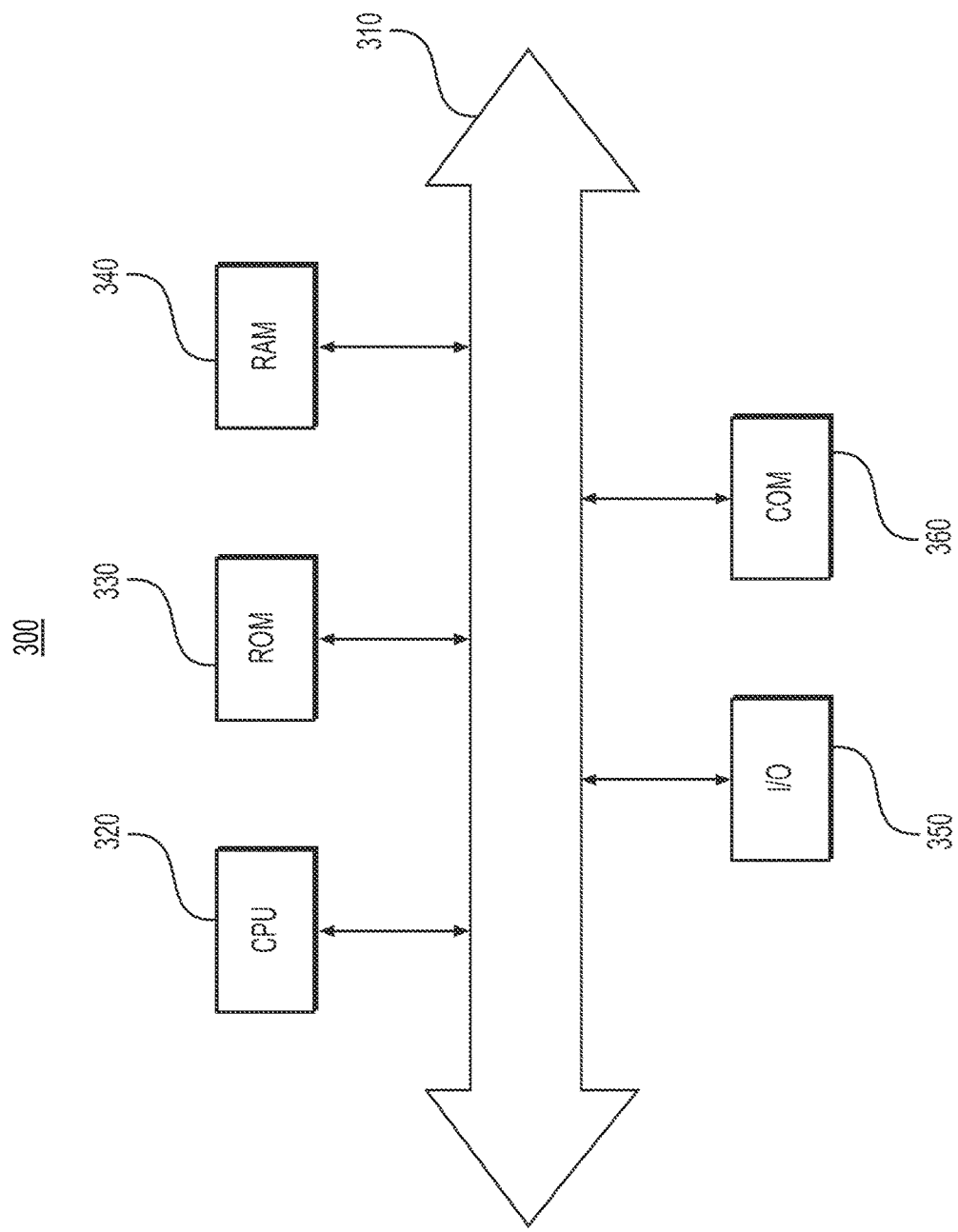
FIG. 3 illustrates an example system that executes techniques presented herein.

FIG. 3 depicts an example system 300 that is configured to perform and/or execute techniques presented herein. FIG. 3 is a simplified functional block diagram of a computer that may be configured to execute techniques described herein, according to exemplary embodiments of the present disclosure. Specifically, the computer (or "platform" as it may not be a single physical computer infrastructure) may include a data communication interface 360 for packet data communication. The platform also may include a central processing unit ("CPU") 320, in the form of one or more processors, for executing program instructions. The platform may include an internal communication bus 310, and the platform also may include a program storage and/or a data storage for various data files to be processed and/or communicated by the platform such as ROM 330 and RAM 340, although the system 300 may receive programming and data via network communications. The system 300 also may include input and output ports 350 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Figure 4:
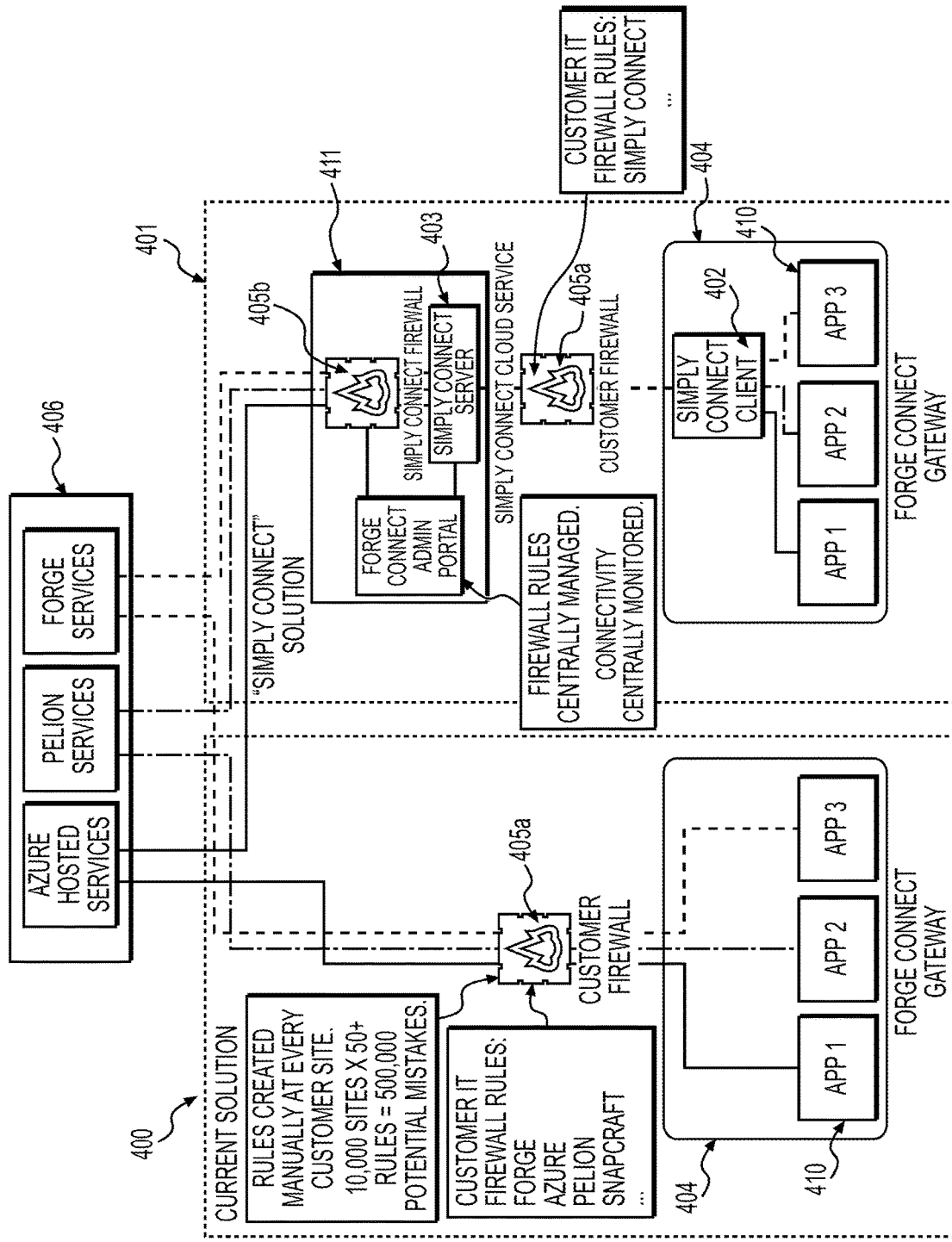
FIG. 4 illustrates an exemplary networking environment with Virtual client and Virtual server, in accordance with an embodiment of the present disclosure.

FIG. 4 illustrates an exemplary networking environment with Virtual client and Virtual server, in accordance with an embodiment of the present disclosure. As shown in FIG. 4, the network environment 401 includes connectivity system 402, 403, gateways 404, firewalls 405. The network environment 401 may be communicably connected to cloud computing services 406. The gateways 404, for example, may be the edge gateways as discussed previously in conjunction with FIG. 1 and FIG. 2. The gateways 404, for example, may be FORGE-Connect gateways provided by Honeywell. These gateways 404 may be either physical or virtual gateways. The cloud computing services 406, for example, are services or applications hosted by the IoT platform as discussed previously in conjunction with FIG. 1 and FIG. 2. According to an embodiment, the firewalls 405 include an organization firewall 405a and a cloud-based firewall 405b. The organization firewall 405a, for example, may be a firewall of an organization with a set of policies manually coded in the firewall by an IT administrator. The cloud-based firewall 405b, for example, may be a replica of the organization's firewall 405a provisioned virtually on the networking environment 401. One or more applications 410 residing in the gateways 404, for example, may be enterprise applications of one or more assets of the organization as discussed previously in conjunction with FIG. 1 and FIG. 2. According to an embodiment, the connectivity system 402, 403 includes a Virtual client 402 and a Virtual server 403, hereinafter referred to as, a client and a server. The Virtual client 402, for example, may be a software control package installed on the gateway 404. The Virtual sever 403, for example, may be a cloud-based server residing on a cloud platform 411 in the networking environment 401. The cloud platform 411, for example, may be a third-party cloud platform or Honeywell hosted cloud platform.

As shown in FIG. 4, a comparison of prior network environment 400 and current network environment 401 implemented with the connectivity system 402, 403 is shown for ease of explanation. The network environments 400, 401 shows an example implementation using a single gateway, single client, and a single server for the ease of explanation. It is understood that multiple gateways, clients and servers may be employed as a part of the network environment as shown in FIG. 1 and FIG. 2. In the prior network environment 400, each enterprise applications 410 such as APP 1, APP 2, APP 3 may establish individual connection to the organization's firewall 405a requesting access to the cloud-based service 406. The organization's firewall 405a may grant or deny access to the enterprise applications 410 based on the set of policies manually coded in the firewall 405a. In this regard, data traffic in the prior network environment 400 may be increased leading to latency in processing the requests of the enterprise applications 410. Accordingly, there is a requirement for a network environment which provides faster processing of the request by efficiently managing the data traffic in the network environment without compensating on the firewall policies of the organization.

As shown in FIG. 4, the current network environment 401 includes the connectivity system 402, 403 provisioned along with the existing organization's firewall and gateways. The connectivity system 402, 403 includes the client 402 installed or provisioned at the gateway 404 and the server 403 installed or provisioned at the cloud platform 411. According to an embodiment, the client 402 and the server 403 are provisioned as a VPN client 402 and a VPN server 403 communicating with each other through a VPN tunnel. According to an embodiment, requests for accessing the cloud-based services 406 are from the enterprise applications 410 are communicated as data packets through the VPN client 402 and the VPN server 403 to the cloud-based services 406. According to an embodiment, the VPN client 402 wraps the data traffic (i.e., the data packet requests) from the enterprise applications 410 and establishes a single connection with the VPN server 403 to access the cloud-based service 406. As shown in FIG. 4, in the prior network environment 400, the enterprise applications 410 may establish individual connections with the organization's firewall 405a to access the cloud-based service 406, however, in the current network environment 401, the VPN client 402 at the gateway 404 wraps the data traffic and establishes a single connection to the VPN server 403 via the organization's firewall 405a. In this regard, when the enterprise applications 410 establish individual connections with the organization's firewall 405a, there exists a requirement for the firewall 405a to maintain the firewall policies for each of the enterprise applications 410 or gateways 404 connecting to the firewall 405a for access to the cloud-based service 406. However, in the current network environment 401, such firewall policies for the enterprise applications 410 or gateways 404 are centrally managed at the VPN server 403 reducing a load on the organization's firewall 405a as the IT administrator may refrain from configuring the firewall 405a with voluminous firewall policies. For example, the IT administrator may have to configure 40+ URLs in the firewall exception. According to an embodiment, in the current network environment 401, the organization's firewall 405a may include one URL capable of re-directing the data traffic to the VPN server 403 and then to the cloud-based firewall 405b. For example, the IT administrator may have to configure one URL such as https://simplyconnect.honeywell.com in the firewall exception to redirect the data traffic to the VPN server 403. In this regard, when a new gateway 404 is onboarded to the network environment 401, the IT administrator may refrain from configuring new firewall policies to the organization's firewall 405a as the firewall policies are centrally managed in the cloud platform 411 by the VPN server 403.

As shown in FIG. 4, the enterprise applications 410 of the gateway 404 establish a connection with the VPN client 402. The VPN client 402 consolidates the data traffic by routing the data packets (i.e., the IP data packets) through a client-side virtual network interface assigned to a first VPN tunnel of the VPN client 402, which encapsulates the data packets per a VPN protocol. According to an embodiment, the first VPN tunnel may be a user defined tunnel. For example, a standard VPN tunnel may not be compatible with the organization's firewall settings. The standard VPN tunnel may use a standardized VPN protocol which may be different from the protocol used by the organization's firewall. The standardized VPN protocol, for example, may be OpenVPN TCP or OpenVPN UDP protocol and the protocol used by the organization's firewall, for example, may be a TLS protocol. The user defined protocol may be created to overcome the compatibility issues between the protocol of the VPN client 402 and the organization's firewall 405a. According to an embodiment, the client-side virtual network interface assigned to the first VPN tunnel may transfer the data packets through a TLS-over-TCP connection. In some examples, the user defined tunnel may be defined as a WebSocket tunnel created without using an open source (OpenVPN) tunneling solution. The VPN client-side architecture will be explained in detail in conjunction with FIG. 5.

As shown in FIG. 4, the enterprise applications 410 of the gateway 404 establish a connection to the cloud-based service 406 via the VPN server 403. The VPN server 403 routes the data packets to the cloud-based service 406 after decapsulating the data packets. The data packets are unwrapped by the server-side virtual network interface assigned to a second VPN tunnel. The second VPN tunnel may be a replica of the first VPN tunnel. The second VPN tunnel transfer the data packets through the TLS-over-TCP connection to the VPN server 403. The VPN server 403 may route the data packets to the cloud-based service 406 using a cloud-based routing protocol. The VPN server-side architecture will be explained in detail in conjunction with FIG. 6.

As shown in FIG. 4, the cloud platform 411 further includes a virtual admin portal 420, for example, a Virtual admin portal which may a web application configured as an administrative interface for the gateways 404 in the current network environment 401. In some examples, the virtual admin portal 420 may be configured to manage firewall rules, issue and validate security certificates, client identity management, etc. In some examples, all cloud-based components in the current network environment 401 may be configured via the virtual admin portal 420. The function of the virtual admin portal 420 will be explained in detail in conjunction with FIG. 7.

Figure 5:
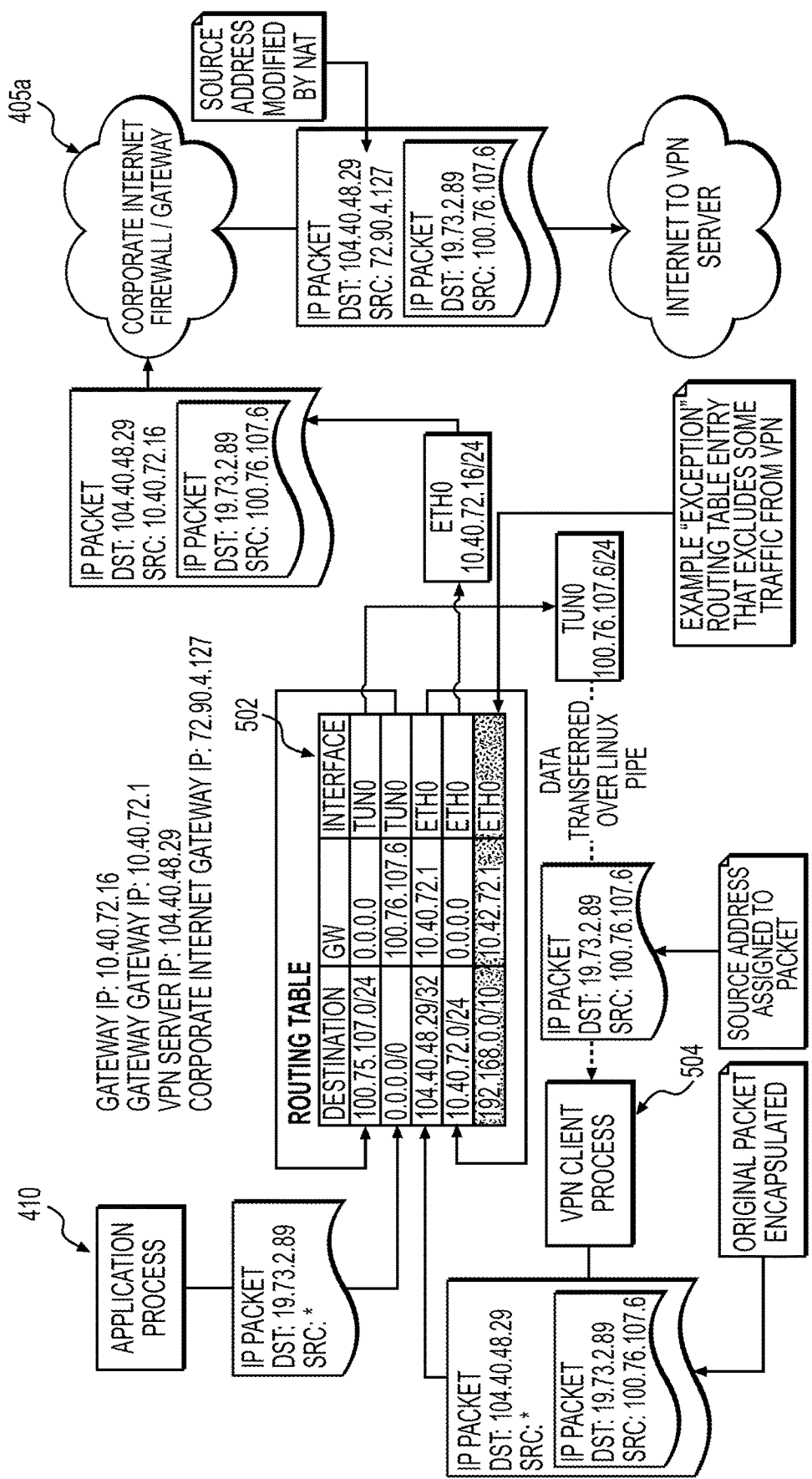
FIG. 5 illustrates an exemplary Virtual client architecture, in accordance with an embodiment of the present disclosure.

FIG. 5 illustrates an exemplary Virtual client architecture, in accordance with an embodiment of the present disclosure. The Virtual client architecture includes a single client which receives data packets from a single enterprise application for illustration purposes, but those of ordinary skill in the art will recognize that the client architecture contemplates a plurality of client devices. As discussed earlier, the client 402 receives IP data packets from the enterprise applications 410 and encapsulates it using a VPN protocol. The encapsulated IP data packet is then routed to the server 403 by the organization's firewall 405a. As shown in FIG. 5, the IP data packets from the enterprise applications 406 is pushed to a routing table 502 on the VPN client 402, for example, a Linux based routing table. The routing table 502 includes a list of destination IP address 502a to route the IP data packet, gateway IP addresses 502b, and virtual/physical network interfaces 502c available in the current network environment 401. The IP data packets from the enterprise application 410 is routed to a virtual tunnel via the routing table 502 based on the list of destination IP address 502a. The IP data packets from the virtual tunnel is encapsulated into a larger IP data packet using a VPN client-process block 504. The encapsulated IP data packet is routed to the VPN server 403 via the routing table 502. The encapsulated IP data packet is forwarded to a physical network interface based on the list of destination IP address 502a. The encapsulated IP data packet is routed from the physical network interface to the organization firewall 405a. The organization firewall 405a may be configured with one URL such as https://simplyconnect.honeywell.com in the firewall exception to redirect the encapsulated IP data packet to the VPN server 403. In some examples, a source address of the encapsulated IP data packet by a Network Address Translation (NAT) block before routing the data packet to the VPN server 403. According to an embodiment, the VPN client-process block 504 may include IP data packet wrapper which encapsulates the IP data packets and forwards the encapsulated IP data packet to the VPN server 403 in a format compatible with the cloud firewall 405*b*. The encapsulated IP data packet may be communicated to the VPN server 403 through the TLS-over-TCP connection.

As shown in the example of FIG. 5, the IP data packet from the enterprise application 410 with destination (DST) address '19.73.2.89' is routed to the routing table 502. The routing table 502 specifies a destination IP address and a virtual network interface to specify a transmission path for the IP data packet. The virtual network interface may be client-side virtual network interface assigned to the first VPN tunnel. The virtual network interface assigned to the first VPN tunnel may be 'tun0' with destination address '100.76.107.6'. The IP data packet is routed through the virtual network interface 'tun0' to the VPN client-process block 504. The IP data packet is assigned a source (SRC) address after passing 'tun0'. The source address may be the IP address of 'tun0', which is '100.76.107.6'.

Accordingly, the IP data packet with SRC: 100.76.107.6' and DST: '19.73.2.89' is now processed at the VPN client-process block 504. The IP data packet may be encapsulated at the VPN client-process block 504 by the IP data packet wrapper. In some examples, the encapsulation may include wrapping the IP data packets from the enterprise applications 410 in another larger IP data packet. The larger IP data packet may be provided with a temporary private IP address. The temporary private IP address may be a new destination address to route the larger IP data packet (i.e., the encapsulated IP packet). The new destination address may be an IP address '104.40.48.29' of a load balancer on the VPN server 403. The encapsulated IP data packet may be routed as a single data packet through the routing table 502 to the physical network interface 'eth0'. The physical network interface 'eth0' may be an ethernet network. The encapsulated IP data packet may be routed to the physical network interface 'eth0' with IP address '10.40.72.16'. The SRC address of the encapsulated IP data packet may be the IP address of the physical network interface 'eth0'. The encapsulated IP data packet is routed to the organization's firewall 405*a* through which the encapsulated IP data packet is transmitted to the VPN server 403.

According to an embodiment, the SRC address of the encapsulated IP data packet may be modified using a network address translation (NAT). In some examples, the translation may be a process in which a local IP address specific to the organization may be translated into a Global IP address and vice versa. The SRC address of the encapsulated IP data packet may be modified from '10.40.72.16' to '72.90.4.127'. In some examples, the NAT address uses a range of addresses which are unique to each VPN client 402. The NAT addresses may be used at the VPN server 403 to identify the destination IP address requested by the enterprise application 410. The encapsulated IP data packet with SRC: '72.90.4.127' and DST: '104.40.48.29' may be communicated to the VPN server 403 over the internet as a 'HTTPS' data stream.

Figure 6:
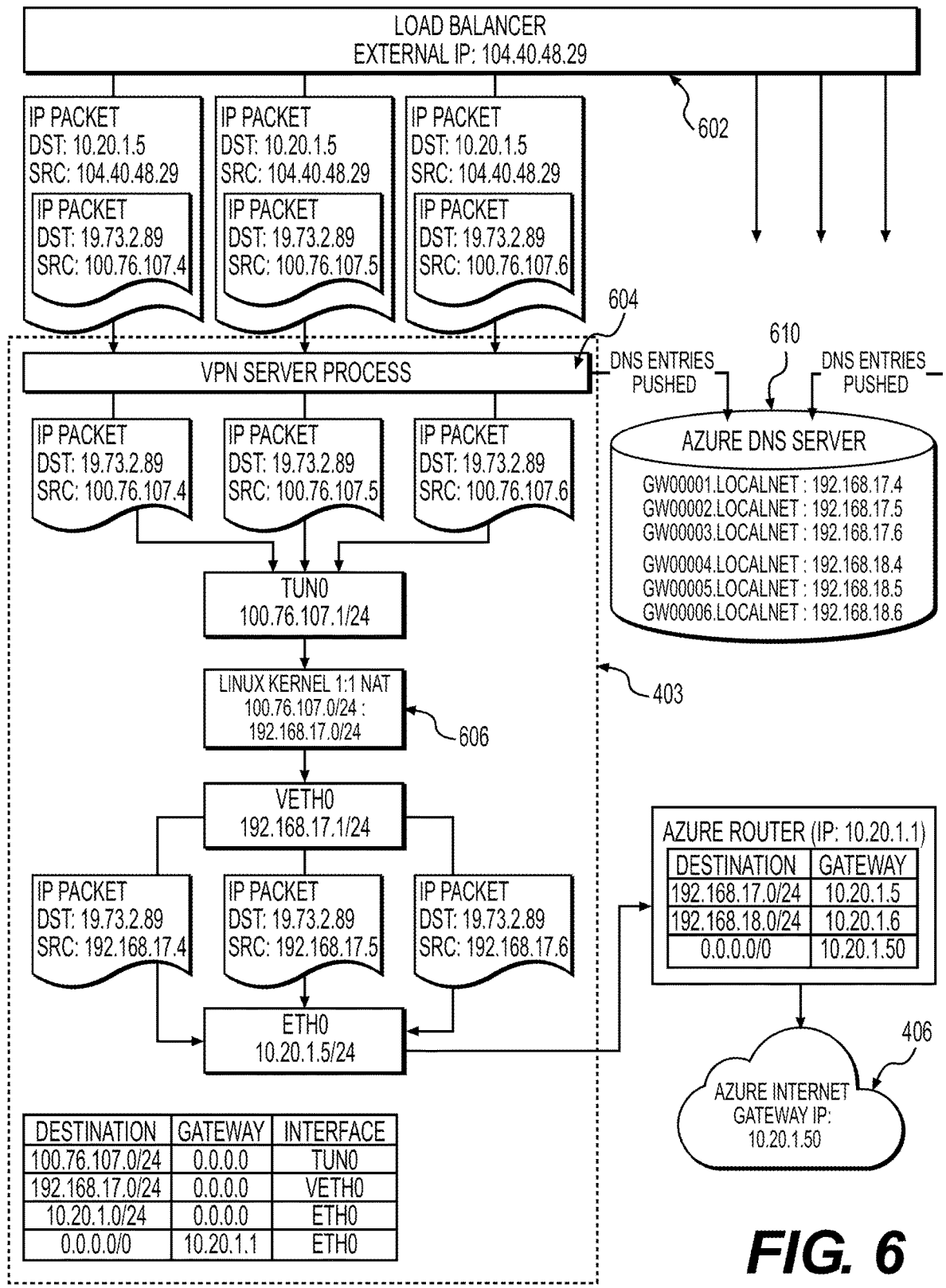
FIG. 6 illustrates an exemplary Virtual server architecture, in accordance with an embodiment of the present disclosure.

FIG. 6 illustrates an exemplary Virtual server architecture, in accordance with an embodiment of the present disclosure. According to an embodiment, the virtual server 403 may be implemented on the cloud platform. The virtual server or the VPN server 403 may include the cloud-based firewall 405*b* which is a virtual firewall of the organization with firewall policies for the gateways 404 requesting access to the cloud-based services 406. According to an embodiment, the encapsulated IP data packet from the gateways 404 are communicated to the VPN server 403. In some examples, a load balancer 602 may be provisioned with the VPN server 403 to distribute the encapsulated IP data packet from each gateway 404 based on a network traffic. The VPN server 403 may include a VPN server process block 604 configured to decapsulate the encapsulated IP data packet. The VPN server process block 604 may include an IP data packet unwrapper to decapsulate or unwrap the one or more IP data packets within the encapsulated IP data packet. The decapsulated IP data packet is routed to virtual tunnel and a Linux NAT block 606 to identify the source IP address and the destination IP address of the one or more IP data packets. When the destination IP address of each IP data packet is identified, the one or more IP data packets are routed to the cloud-based firewall 405*b* which verifies the firewall policies for the gateway 404 based on the destination IP address. The destination IP address is indicative of the cloud-based service that the gateway 404 has requested for access. When the cloud-based firewall 405*b* determines that the gateway 404 has access to the requested cloud-based service, the one or more IP data packets are routed to the cloud-based service via a virtual network interface and a physical network interface.

As discussed previously in conjunction with FIG. 5, the encapsulated IP data packet with SRC: '72.90.4.127' and DST: '104.40.48.29' may be received by a load balancer 602 communicably connected to one or more VPN servers 403. The load balancer 602 may route the requests from the VPN clients 402 across one or more VPN servers 403 capable of fulfilling those requests in a manner that maximizes speed and network capacity utilization. The VPN server 403 may include a VPN server process block 604 configured to decapsulate the encapsulated IP data packet received from the VPN client 402. In some examples, the decapsulation the encapsulated IP data packet includes unwrapping the IP data packets wrapped within the larger IP data packet created by the VPN client process block 504. For example, the IP data packets within the larger IP packet with SRC:100.76.107.4 and DST:19.73.2.89 is unwrapped such that the IP data packets are routed to the requested cloud-based service 406. For example, the larger IP data packet may be decapsulated with an IP-data packet unwrapper. The decapsulated IP data packet is routed to the server-side virtual network interface 'tun0' assigned to the second VPN tunnel and a Linux NAT block 606. As discussed previously, the NAT address uses a range of addresses which are unique to each VPN client 402 and the Linux NAT block 606 on the server side may perform an inverse NAT function to identify the destination IP address to route the decapsulated IP data packets to the cloud-based service 406. As shown in FIG. 6, the NAT block 606 identifies the destination IP address as '192. 168. 17.0' after processing the decapsulated packet from the virtual network interface by co-relating with the IP address '100.76. 107.0' of the virtual network interface of the virtual tunnels (i.e., the first VPN tunnel and the second VPN tunnel). In this regard, the destination IP address of the decapsulated IP data packets is extracted to route it to the cloud-based service 406 in accordance with the destination IP address. The IP data packet may be routed to the cloud-based service 406 via a virtual ethernet interface 'veh0' and a physical ethernet interface 'eth0' interface. In the example of FIG. 6, the cloud-based service 406 may be a Microsoft Azure cloud computing service with Azure routers and Azure gateways.

According to an embodiment, the Virtual server or the VPN server 403 may be communicably connected to a Domain Name System (DNS) server 610. The DNS server 610 may be a cloud-based server running on the same network environment 401 as that of the VPN server 403. The DNS server 610 maintains a track of the IP address of the gateways 404 or VPN client 402 with a hostname and the destination IP address of the cloud-based service 406 requested by each gateway 404. In some examples, the VPN client 402 may connect and disconnect due to network traffic so there exists a requirement for the VPN server 403 to identify the current IP address of the VPN client 402 to establish a communication with the VPN client 402 and grant access to the appropriate cloud-based service 406 requested by the VPN client 402. FIG. 5 and FIG. 6 generally discloses an overall VPN architecture with encapsulated and decapsulated IP data packet being routed based on the architecture, however, implementation of the cloud-based firewall 405b at the virtual VPN server 403 with the virtual admin portal 420 configuring the cloud-based firewall 405b will be explained in detail in conjunction with FIG. 7.

Figure 7:
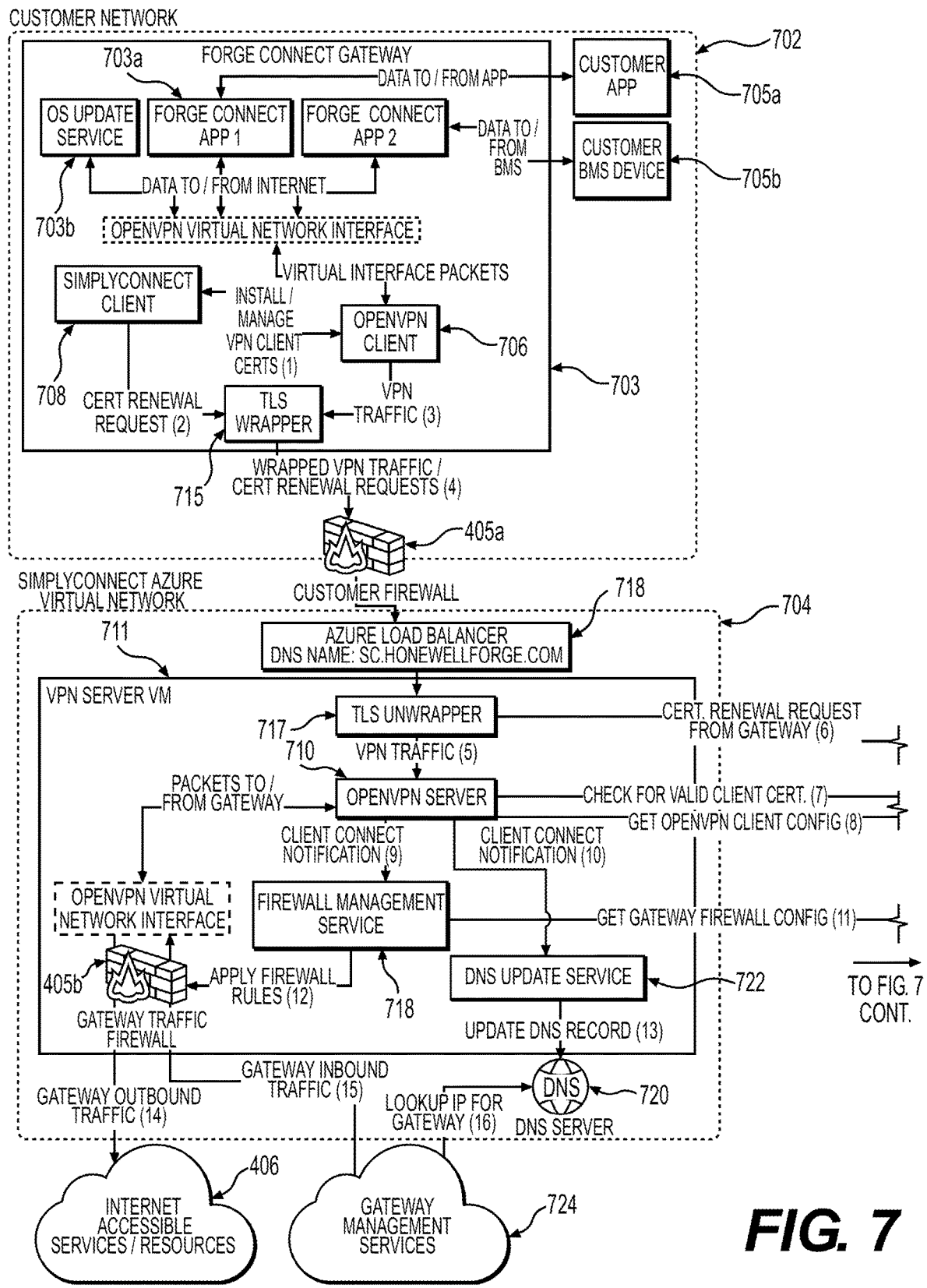
FIG. 7 illustrates an exemplary networking environment with Virtual client, Virtual server and a virtual admin portal, in accordance with another embodiment of the present disclosure.
Figure 7:
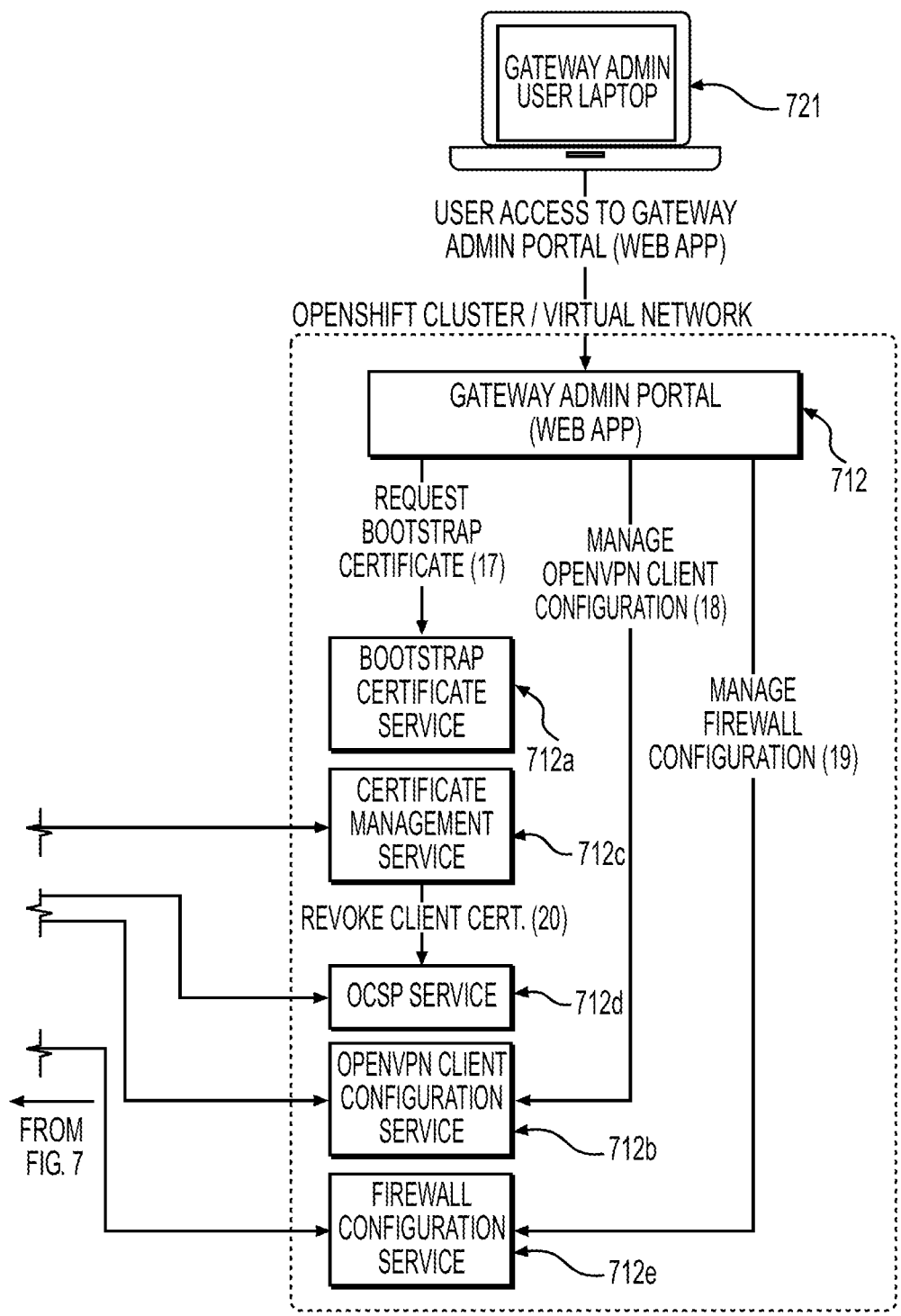

FIG. 7 illustrates an exemplary networking environment with Virtual client, Virtual server and a virtual admin portal, in accordance with another embodiment of the present disclosure. According an embodiment, the networking environment 700 includes two networks, a physical network 702 and a virtual network 704. The physical network 702, for example, is the customer or organization network which includes gateways 703, enterprise applications/devices 705a, 705b (i.e., the customer applications/devices), a first client 706, and a second client 708. The virtual network 704, for example, is a cloud-based network which includes a first server 710, a second server 711, an admin portal 712. The first client 706 and the first server 710, for example, is an OpenVPN client and an OpenVPN server. The second client 708 and the second server 711, for example, is a Virtual client and a Virtual server. The networking environment 700 discloses a single physical network and single virtual network, but those of ordinary skill in the art will recognize that the networking architecture may contemplate a plurality of physical networks and virtual networks.

In some examples, the physical network 702 includes customer/Organization Building Management System (BMS) 705b. The building management system includes smoke detection system, energy management system, ventilation system, etc. installed in the building. These systems include hardware devices such as sensors/detectors/controllers and customer applications 705a such as software packages for the Building Management System (BMS).

According to an embodiment, the gateway 703 includes one or more gateway applications 703a and operating system or firmware service applications 703b. These applications 703a, 703b are configured to communicate with the Customer Applications 705a and Customer Building Management System 705b to request access to a dedicated cloud service 406. Gateway 703 transfer communications between the physical network 702 and the virtual network 704 by converting the IP data packets from one protocol or format to another protocol or format. The gateway 703, for example, may be FORGEConnect gateway.

The dedicated cloud service 406, for example, may be Microsoft Azure Cloud Services which manages several applications including third party vendor applications of the Organization Building Management System (BMS). In some examples, the Customer Applications 705a requesting access to the Azure cloud services may route the request through the FORGEConnect gateway 703. In some examples, the IP data packets of such requests may be managed by the virtual network 704 with the Virtual server 711 such that the access is provided to the FORGEConnect gateway 703 to the cloud service 406 as per the firewall policies of the organization.

According to an embodiment, the gateway 703 includes the first client 706 with a virtual network interface, the second client 708, and an IP data packet wrapper 715. According to an embodiment, the first client 706 with a virtual network interface and the IP data packet wrapper 715 may be a part of the second client 708. For example, the first client 706 with a virtual network interface, the second client 708, and an IP data packet wrapper 715 may be provisioned or installed as a single software module on the gateway 703. According to an embodiment, the gateway 703 includes the first client 706 with a virtual network interface, the second client 708, and an IP data packet wrapper 715 is configured to work in synergy to create an encapsulated IP data packet.

According to an embodiment, the second client 708 installs and manages identity certificates of the first client 706. In some examples, when the identity certificates are expired, the second client 708 may request new or updated identity certificates from the virtual network 704. Tin some examples, the request for new or updated identity certificates may be communicated to the virtual network 704 as an embedded information in the encapsulated IP data packet.

According to an embodiment, the first client 706 may route the data traffic received at the virtual network interface to the IP data packet wrapper 715. The IP data packet wrapper 715, for example, is a TLS wrapper. The IP data packet wrapper 715 encapsulates the IP data packets forwarded by the OpenVPN client (i.e., the first client) 706. The IP data packet wrapper 715 encapsulates the IP data packets in a protocol which can be interpreted by the cloud firewall 405b at the virtual network 704. The protocol of the cloud firewall 405b, for example, may be a TLS protocol. The OpenVPN client 706 may use a TCP protocol. In this regard, the encapsulated IP data packet may be routed to the virtual network 704 through a TLS-over-TCP connection. In some examples, the second client 708 may route the request for the new or updated identity certificates to the virtual network 704 through the IP data packet wrapper 715. According to an embodiment, the IP data packets from the first client 706 and the request for identity certificates from the second client 708 are wrapped by the IP data packet wrapper 715. The encapsulated or wrapped IP data packet is communicated to the virtual network 704.

According to an embodiment, the virtual network 704 includes the first server 710, the second server 711, and the cloud firewall 405b. The encapsulated or wrapped IP data packet from the physical network 702 is communicated to the second server 711 via the load balancer 713. The second server 711 includes an IP data packet unwrapper 717 which decapsulates or unwraps the IP data packets from the encapsulated or wrapped IP data packet. The decapsulated IP data packets are routed to the first server 710. The first server 710 routes the IP data packets to multiple security services on the admin portal 712 and to the cloud firewall 405b. The IP data packets from the gateway 703 requesting access to the cloud service 406 is routed to the cloud firewall 405b from a virtual network interface of the first server 710. The cloud firewall 405b processes the decapsulated IP data packet as per the firewall policies of the organization managed by the admin portal 712 on the virtual network 702. The IP data packets are granted access to the cloud service 406 as per the firewall policies. In some examples, the firewall policies for all connected gateways 703 to the second server 711 is managed by a Firewall Management Service 718. The Firewall Management Service 718 applies the appropriate rules to the cloud firewall 406. In some examples, the first server 710 notifies the Firewall Management Service 718 when the first client 706 connects or disconnects from the virtual network 702 to apply the appropriate rules to the cloud firewall 406 based on the connection status of the first client 706. The IP data packets from the second client 708 indicative of the request for identity certificates may be routed to multiple security services on the admin portal 712. The multiple security services may respond to the first server 710 and the Firewall Management Service 718 based on the requests. The multiple security services on the admin portal 712 for processing the requests from the from the second client 708 is described in the detail in the following description.

According to an embodiment, the virtual network 702 further includes a Domain Name System (DNS) server 720. The DNS server 720 may be a cloud-based server running on the same network environment as that of the first server 710 and the second server 711. The DNS server 710 maintains a track of the IP address of the gateway 703 of with a hostname and the destination IP address requested by each gateway 703 in the form of lookup tables. The first server 710 may update lookup tables of the DNS server 720 via a DNS Update Service 722 which updates the DNS server 720 with the network IP address for connected gateways 703. In some examples, the DNS update service 722 updates the hostname for the gateway 703. In some examples, the DNS server 720 may be accessed by a remote Gateway Management Service 724 to find the network IP address for the gateway 703 such that the Gateway Management Service 724 can connect to an endpoint on the gateway 703. In this regard, the DNS server 720 may facilitate the cloud-based service 406 to communicate with the gateway 703.

According to an embodiment, the admin portal 712 manages a set of security services for the first client 706 in the physical network 702 and the cloud firewall 405*b* in the virtual network 704. The set of security services managed by the admin portal 712 and the execution flow of the security services are described below. In some examples, the admin portal 712 may be a web application accessible by the IT administrator of the organization to manage the clients 706, 708 and the servers 710, 711. According to an embodiment, the admin portal 712 may be installed on computer systems 721 hosted on the cloud platform 411 and maintained by the organization. The computer systems 721 provide a user interface to manage client specific OpenVPN configuration and firewall rules of the gateway. In some examples, the client specific OpenVPN configuration may include routing rules that implement split tunneling on the gateway. In some examples, the admin portal 712 administers the firewall rules or policies via an application programming interface (API).

According to an embodiment, the set of security services managed by the admin portal 712 includes Bootstrap certificate service 712*a*, Client configuration service 712*b*, Client certificate management service 712*c*, Online Certificate Status Protocol (OCSP) service 712*d*, and Firewall configuration service 712*e*. The functions provided by these security services are provided in the table below.

TABLE 1

| | |
|---|---|
| Bootstrap certificate service 712a | Issues the bootstrap client certificate on the gateway. When the gateway at the organization is a physical gateway, the certificate is shipped with the physical gateway. When the gateway at the organization is a virtual gateway, the certificate is installed during initial setup. For example, when a new gateway is provisioned via the Admin Portal, the portal issues a request to obtain a bootstrap certificate for that gateway. |

TABLE 1-continued

| | |
|---|---|
| Client configuration service 712b | Manages OpenVPN configuration for each OpenVPN client/Gateway. The request for the configuration is provided by the OpenVPN server |
| Client certificate management service 712c | The SimplyConnect client may transfer IP data packets related to the OpenVPN client certificate updates or renewals via the IP data packet un-wrapper of the virtual network. The management service obtains an initial OpenVPN certificate and/or renews an OpenVPN certificate for the OpenVPN client. In some examples, when the Certificate Management Service issues a new OpenVPN certificate to the client, it transmits a request to a OCSP service to revoke the previously issued certificate. |
| Online Certificate Status Protocol (OCSP) service 712d | The service may be used to determine whether a client certificate has been revoked. For example, when a new client connects to the OpenVPN server, the OpenVPN server makes a request to the OCSP service to determine if the certificate has been revoked. |
| Firewall configuration service 712e | Manages firewall configuration (rules or policies) for each client/Gateway as dictated by the organization. The firewall configuration service is in communication with the firewall management service of the virtual network to manage the cloud firewall rules or policies. For example, when a new client connects to the OpenVPN server, the OpenVPN server makes a request to the Client Configuration Service to retrieve any OpenVPN client configuration. The Firewall Configuration Service may provide the firewall configuration for a newly connected client in the network based on the connection status of the client in the network. In some examples, the Firewall Configuration Service may host the application programming interface (API) through which the firewall rules or policies are administered by the admin portal. |

Figure 8:
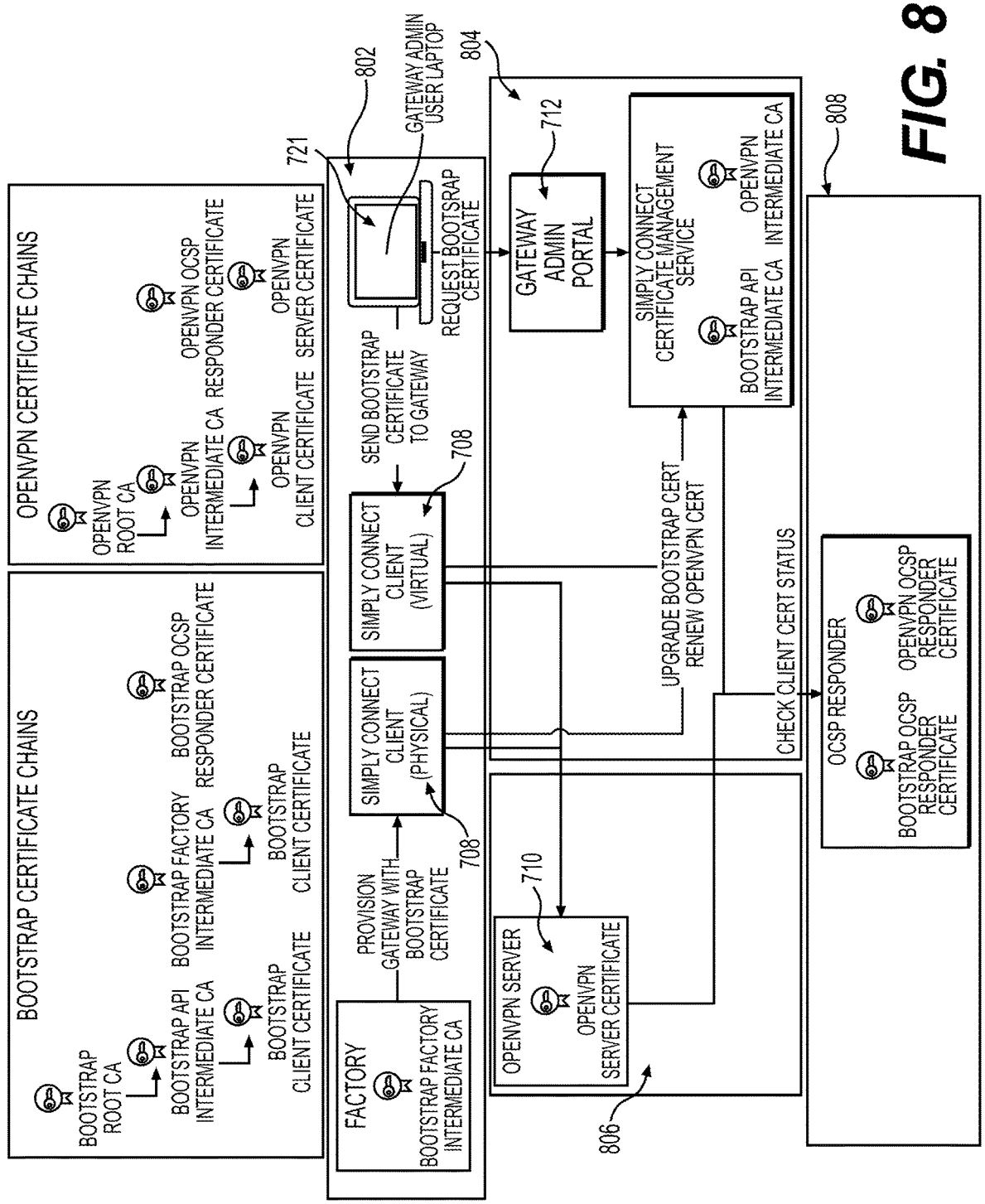
FIG. 8 illustrates an exemplary flow diagram for management of client certificates, in accordance with another embodiment of the present disclosure.

FIG. 8 illustrates an exemplary flow diagram for management of client certificates, in accordance with another embodiment of the present disclosure. According to an embodiment, Virtual certificate management service 712*c* uses a Public key infrastructure (PKI) based approach for client certificate management. The client certificate management involves managing the identity of the client 706, 708 such that appropriate firewall rules or policies may be implemented for the client 706, 708 connecting to the Virtual server 711. There are two types of client identity management using PKI approach, one being the bootstrap identity and the other being OpenVPN identity, determined by the root certificate authority (CA) in a certificate chain for the client's certificate, which will either be the bootstrap root ca, or the OpenVPN root ca, both managed by the Virtual. The flow diagrams depict the client certificate management using both the types of the PKI approach.

The client certificate management in the virtual network may begin at block 802 in which a Virtual client 708 may be issued with a bootstrap certificate, which will either be generated at the factory for hardware-based gateways or requested with the Virtual bootstrap certificate service 712*a* by an authenticated user through admin Portal 712 while a virtual gateway 703 is being registered. At block 804, the bootstrap certificate provides the client access to the Virtual certificate management API to upgrade to an OpenVPN certificate. Once the Virtual client 708 starts with a bootstrap certificate, it will make a request to the Virtual certificate management API to upgrade to an OpenVPN certificate. This request will authenticate with the bootstrap certificate, and the client will provide a Certificate Signing Request (CSR). In some examples, when a client upgrades their bootstrap certificate to an OpenVPN certificate, the bootstrap certificate will be revoked. In some examples, the OpenVPN client certificates will have a 90-day expiration, so when the Virtual client 708 detects its certificate is close to expiration, a renewal request may be transmitted to the Virtual certificate management API to renew the certificate. In some examples, the certificate may be authenticated and a CSR similar to the bootstrap upgrade request may be issued. In this regard, when a clients certificate is renewed, the previous certificate will be revoked.

At block 806, when the server 710 validates that the bootstrap certificate is valid, it will sign the Certificate Signing Request (CSR) with the OpenVPN intermediate CA and transmit the resulting certificate to the client. The client may use this certificate to authenticate to the OpenVPN server, as well as make subsequent calls to the certificate management API. At block 808, client certificate revocation may be handled by an Online Certificate Status Protocol (OCSP) responder which will query a data proving a look up table for certificate status for each client.

Figure 9:
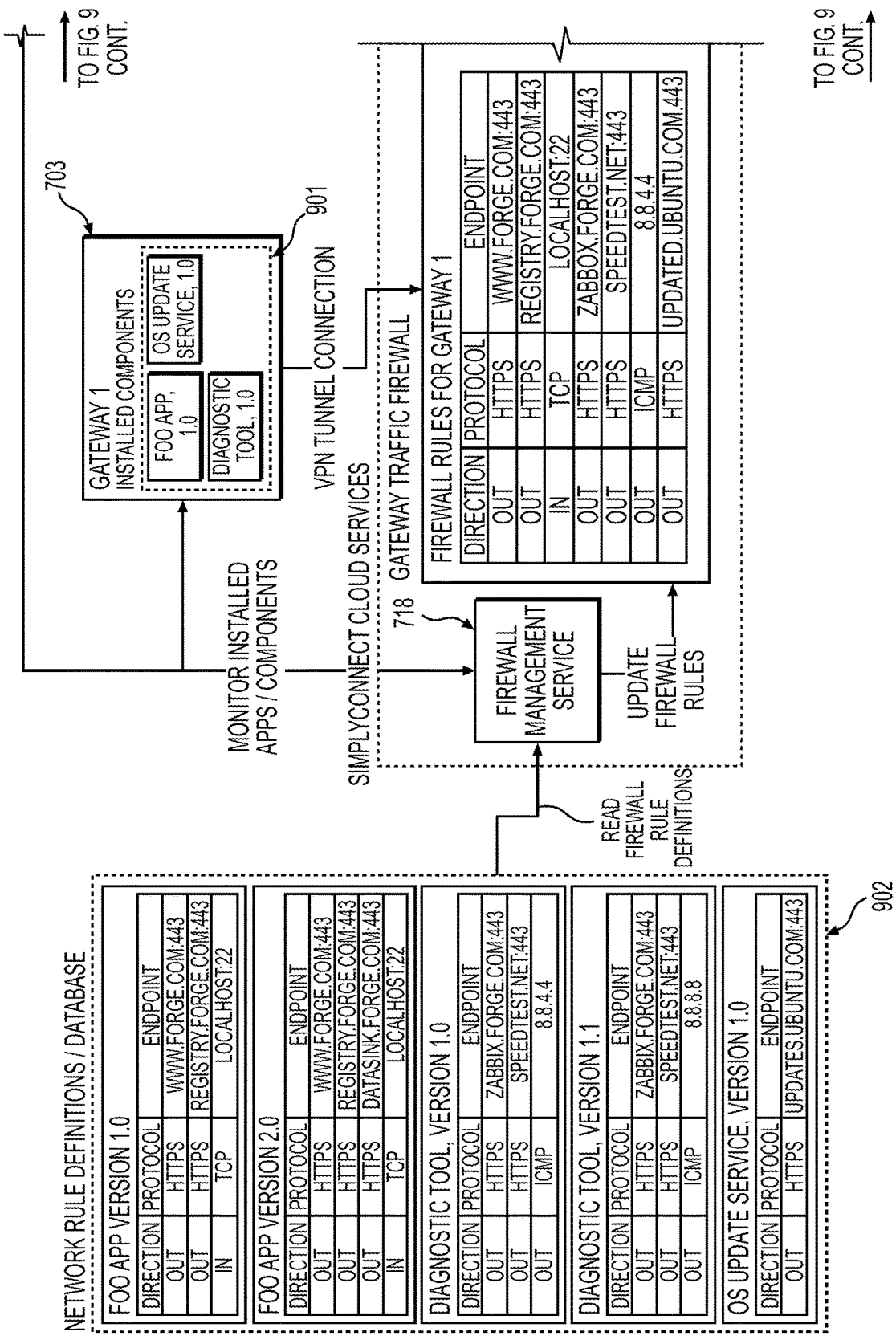
FIG. 9 illustrates an exemplary architecture of automatic policy enforcement provided by the Virtual client, in accordance with an embodiment of the present disclosure.

FIG. 9 illustrates an exemplary architecture of automatic policy enforcement provided by the Virtual client, in accordance with an embodiment of the present disclosure. According to an embodiment, the virtual network 704 with the Virtual server 711 via the firewall management service 718 may define the firewall rules/policies for each software component 901 that could be deployed in the gateway 703. The software components 901 are the enterprise applications which may be the organization's/customer application or third-party vendor applications. According to an embodiment, each of the software components 901 may include an additional file that defines the firewall rules/policies. The firewall management service 718 hosted on the virtual network 704 may access the additional file to configure the cloud-based firewall 405b. In some examples, if the software component 901 is provided by a third-party vendor, then the additional file may be maintained externally in a separate database (i.e., a virtual database) 902, which can be accessed by the firewall management service 718 to configure the cloud-based firewall 405b. The cloud-based firewall 405b may be configured as per the rules/policies listed in the additional file. In this regard, when a new gateway 703 may be provisioned at a customer site, Virtual server 711 will examine the rules/policies defined for all the components 901 that are installed on the gateway 703 and configure the cloud-based firewall 405b to only allow access in compliance with those rules. In some examples, when the gateway 703 is modified by adding, updating, or removing software components 901, the Virtual server 711 will adjust the cloud firewall rules to reflect the settings required by the new components 901 on the gateway 703. In some examples, the firewall management service 718 can override the existing policies/rules for a gateway 703 provisioned through the firewall API on the admin portal 712 by configuring the cloud-based firewall using the policies/rules provided as part of the software component 901. In this regard, the firewall policies may be configured or modified automatically by the Virtual server 711 without the requirement of an additional firewall configuration service 712e on the admin portal 712.

In the exemplary architecture shown in FIG. 9, the firewall management service 718 of the Virtual server 711 may access the gateways 703 to identify the software components installed on each gateway 703. In response to identifying the software components 901, the additional file stored in the virtual database 902 or stored as part of the software component 901 is accessed to retrieve the firewall policies/rules to be implemented for the gateways 703. It is seen that each software component 901 on the gateway 703 includes one or more firewall rules/policies associated with it. These firewall policies/rules may be configured on the cloud-based firewall 405b to allow access to the gateways 703 in compliance with those rules. The inbound or the outbound traffic from or to the gateway 703 are routed through the cloud-based firewall 405b and governed by the firewall policies/rules.

Figure 10:
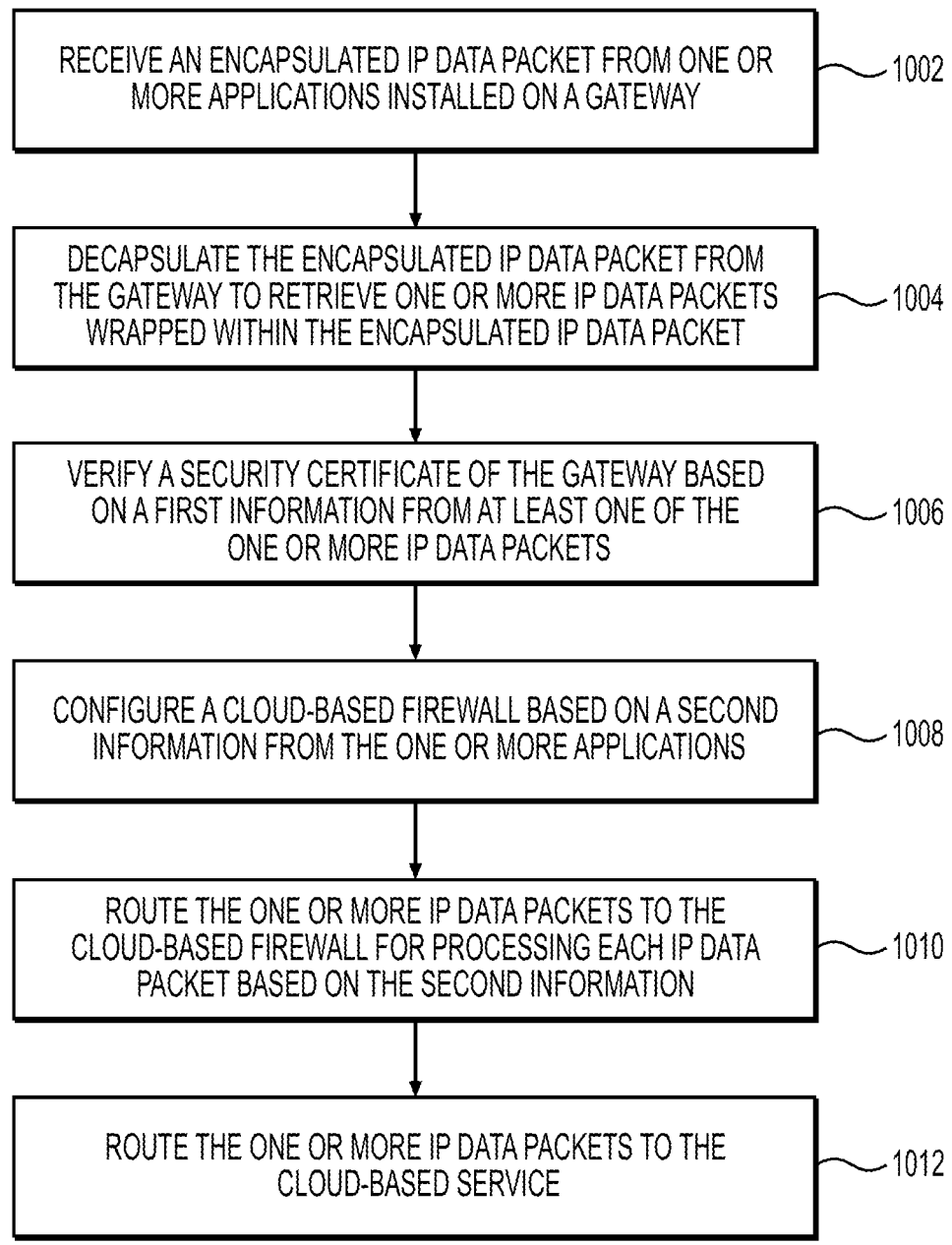
FIG. 10 illustrates a flow chart depicting operations performed at the Virtual server, in accordance with an embodiment of the present disclosure.

FIG. 10 illustrates a flow chart depicting operations performed at the Virtual server, in accordance with an embodiment of the present disclosure. The operations are performed in the virtual environment with a virtual cloud-based server (i.e., the Virtual server). The cloud-based server is a computer system or group of computer systems on a cloud computing platform (e.g., IoT platform) with scalable resources for computation. In some examples, the computer system may include one or more processors, databases, software services and/or applications to perform the computation. As discussed previously, the cloud-based server is communicably connected to the gateways to transmit or receive information, for example, in the form of IP data packets. The cloud-based server may perform the computation on incoming and outgoing IP data packets to and from the gateways. At step 1002, the cloud-based server receives an encapsulated IP data packet from one or more applications installed on a gateway. According to an embodiment, the encapsulated IP data packet is created by a client installed in the gateway. The client, for example, is a OpenVPN client, Virtual client or the combination. The embodiments disclosing the method and the system involved in collating the IP data packets from each enterprise application on the gateway and creating the encapsulated IP data packet using a Linux based Routing table with a VPN client process block, client-side virtual network interface and a first VPN tunnel is discussed in detail in conjunction with FIG. 4 and FIG. 5. The encapsulated IP data packet in communicated to the cloud-based server via TLS-over-TCP connection or HTTP connection. At step 1004, the cloud-based server decapsulates the encapsulated IP data packet from the gateway to retrieve one or more IP data packets wrapped within the encapsulated IP data packet. In some examples, the one or more IP data packets may be the requests from the enterprise applications installed on the gateway to access cloud-based services. The cloud-based services may be one of Infrastructure-as-a-Service (IaaS), Platforms-as-a-Service (PaaS), and Software-as-a-Service (SaaS). Examples of the cloud-based services may be Microsoft Azure, Amazon Web Services, Google Cloud Platform and the like. The embodiments disclosing the method and the system involved in decapsulating the encapsulated IP data packet using the VPN server process block, IP data packet un-wrapper, server-side virtual network interface, a second VPN tunnel, and Linux NAT block discussed in detail in conjunction with FIG. 4, FIG. 6 and FIG. 7. At step 1006, the cloud-based server verifies a security certificate of the gateway based on a first information from at least one of the one or more IP data packets. The security certificate may include OpenVPN client certificates and bootstrap certificate which is provided to verify a client identity and certificate validity/renewal. In some examples, such security certificates may be issued and managed by the Client certificate management service and the Bootstrap certificate service. The first information, for example, may be the information in the decapsulated IP data packets related to the security certificates. For example, the client (i.e., the SimplyConnect client) may transfer the first information in the IP data packets related to the OpenVPN client certificate updates or renewals. The security services may obtain an initial OpenVPN certificate and/or renews an OpenVPN certificate for the OpenVPN client. The embodiments disclosing the method and the system involved in verifying the client identity by managing the security certificates is discussed in conjunction with FIG. 7 and FIG. 8. At step 1008, the cloud-based server configures a cloud-based firewall based on a second information from the application. The second information, for example, may be the information related networking rules to be implemented by the cloud-based firewall when the application requests the access to the cloud-based services. These networking rules may be configured on the cloud-based firewall as firewall rules/policies for each gateway and/or for each application on the gateway. In some examples, the second information may be part of the one or more IP data packets decapsulated at the cloud-based server. In some examples, the second information may be part of the application and installed as an additional file in the application. In some examples, the second information may reside on a separate database. The second information provisioned in the application and/or the database may be accessed by the cloud-based server to configure the cloud-based firewall. In some examples, a firewall management/configuration service on the cloud-based server may access, configure and manage the firewall rules/policies on the cloud-based firewall for each application on the gateway. The embodiments disclosing the method and the system involved in configuring the cloud-based firewall with the network rules/policies hosted by the application and/or database is discussed in conjunction with FIG. 9. At step 1010, the cloud-based server routes the one or more IP data packets to the cloud-based firewall to process each IP data packet based on the second information. In some examples, the processing of the one or more IP data packets based on the firewall rules/policies provisioned on the cloud-based firewall may determine whether the application requesting access to the cloud-based service is eligible to access the cloud-based service. The cloud-based firewall, for example, are software-based, cloud deployed network devices, which can stop or mitigate unwanted access to the cloud-based services from applications which are external to the organization. Such access rules/policies are provided by the second information which is provided as part of the application. In this regard, a new application installed in the gateway may be provided with an option to define its own networking rules to access the cloud-based service. In this regard, the organization may provision both the firewall management service and the firewall configuration service on the cloud-based server without provisioning such firewall services on a separate admin portion hosted by the organization. Further, providing the network rules as a part of the application may mitigate the need of an IT administrator of the organization to configure the cloud-based firewall for each application through the admin portal. At step 1012, the cloud-based server routes the one or more IP data packets to the cloud-based service in response to the one or more IP data packets being compliant with the first information provided to authenticate the gateway and the second information provided to configure the cloud-based firewall. The embodiments disclosing the method and the system involved in handling the first information related security certificates of the gateway and/or client and the second information related to firewall rules/policies for automatic policy enforcement is discussed in conjunction with FIG. 7, FIG. 8 and FIG. 9.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms "first," "second," etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," When used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of. Furthermore, to the extent that the terms "includes" and "including," and variants thereof are used in either the detailed description or the claims, these terms are intended to be inclusive in a manner similar to the term "comprising."

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A method comprising:
   receiving, by a cloud server with one or more processors, an encapsulated IP data packet from one or more applications installed on a gateway device, wherein the one or more applications request access to a cloud-based service;
   decapsulating, by the cloud server with the one or more processors, the encapsulated IP data packet from the gateway device to retrieve one or more IP data packets wrapped within the encapsulated IP data packet;
   verifying, by the cloud server with the one or more processors, a security certificate of the gateway device based on a first information from at least one of the one or more IP data packets;

configuring, by the cloud server with the one or more processors, a cloud-based firewall based on a second information from the one or more applications;

routing, by the cloud server with the one or more processors, the one or more IP data packets to the cloud-based firewall for processing each IP data packet based on the second information; and wherein in response to the one or more IP data packets being compliant with the first information provided to authenticate the gateway device and the second information provided to configure the cloud-based firewall, routing, by the cloud server with the one or more processors, the one or more IP data packets via a cloud communication network protocol to the cloud-based service.

2. The method of claim 1, wherein the first information is a request for a valid, new or updated identity certificates for the gateway device which is wrapped as a part of the encapsulated IP data packet.

3. The method of claim 1, wherein the second information is indicative of the firewall rules/policies for each application or the gateway device.

4. The method of claim 1, further comprises:
routing, by the cloud server with the one or more processors, the first information to a virtual admin portal to retrieve the security certificate of the gateway device.

5. The method of claim 1, further comprises:
automatically revoking, by the cloud server with the one or more processors, a previously issued security certificate when a new security certificate is issued by a virtual admin portal.

6. The method of claim 1, further comprises:
retrieving, by the cloud-based server with the one or more processors from a virtual admin portal, a client configuration in response to the first information, wherein the first information is indicative of a new gateway device connected to the cloud server.

7. A virtual cloud-based networking platform comprising:
a cloud-based admin portal to manage a set of security services for gateway devices;
a virtual database;
one or more cloud-based servers with one or more processors communicably connected to the cloud-based admin portal and the virtual database, wherein the one or more processors configured to:
receive an encapsulated data packet from a gateway device installed in an organization network, wherein the organization network comprises one or more hardware devices and applications transmitting one or more data packets to the gateway device, wherein the one or more data packets comprise a request to access one or more cloud-based services;
decapsulate the encapsulated data packet from the gateway device to retrieve the one or more data packets wrapped within the encapsulated data packet;
verify a security certificate of the gateway device by accessing the cloud-based admin portal, wherein the security certificate is issued by the cloud-based admin portal to validate an identity of a client on the gateway device;
configure a cloud-based firewall based on a second information hosted by the virtual database; and
process the one or more data packets based on the second information, wherein in response to the one or more data packets being compliant with the second information,
route the one or more data packets via a cloud communication network protocol to the one or more cloud-based service.

8. The virtual cloud-based networking platform of claim 7, wherein the security certificate is one of a Bootstrap certificate or a OpenVPN certificate issued for a one of a new OpenVPN client or an existing OpenVPN client installed on the gateway device.

9. The virtual cloud-based networking platform of claim 7, wherein the second information is indicative of the network rules/policies for each application or the gateway device.

10. The virtual cloud-based networking platform of claim 7, wherein the second information is one of embedded as an additional file in the one or more applications or stored in the form of lookup tables in the virtual database.

11. The virtual cloud-based networking platform of claim 7, wherein the cloud-based admin portal comprises a firewall Configuration Service hosted as an application programming interface (API) through which the firewall rules or policies are administered by the cloud-based admin portal.

12. A system comprising:
a virtual client with one or more processors communicably connected to a virtual server, wherein the one or more processors configured to:
receive one or more data packets from one or more applications installed on a gateway device installed in an organization network, wherein the organization network comprises one or more hardware devices and applications transmitting one or more data packets, wherein the one or more data packets comprise a request to access one or more cloud-based services;
encapsulate the one or more data packets into an encapsulated data packet; and
route the encapsulated data packet through a virtual tunnel interface to the virtual server;
the virtual server with one or more processors communicably connected to a cloud-based admin portal and a virtual database, wherein the one or more processors configured to:
receive the encapsulated data packet from the virtual client through the virtual tunnel interface in a data format compatible with a cloud-based firewall;
decapsulate the encapsulated data packet to retrieve the one or more data packets wrapped within the encapsulated data packet;
verify a security certificate of the gateway device by accessing the cloud-based admin portal, wherein the security certificate is issued by the cloud-based admin portal to validate an identity of the virtual client on the gateway device;
configure the cloud-based firewall based on a second information hosted by the virtual database; and
process the one or more data packets based on the second information, wherein in response to the one or more data packets being compliant with the second information,
route the one or more data packets via a cloud communication network protocol to the one or more cloud-based service.

13. The system of claim 12, further comprises:
a Domain Name System (DNS) server configured to maintain a track of IP address of the gateway device with a hostname and a destination IP address of the cloud-based service requested by each application on the gateway device.

14. The system of claim 12, further comprises:

an organization's firewall configured with a single firewall exception in the form of a URL to redirect the encapsulated data packet to the virtual server.

15. The system of claim 12, wherein the virtual tunnel interface communicates the encapsulated data packet to the virtual server through one of a TLS-over-TCP connection or HTTP connection.

16. A gateway device installed in a networking environment comprising:

a first client to route a first data traffic from one or more applications installed at the gateway device to a data packet wrapper, wherein the first data traffic is indicative of a request to access one or more cloud services;

a second client to route a second data traffic to the data packet wrapper, wherein the second traffic is indicative of a request for one of new or updated security certificates for the first client;

the data packet wrapper to encapsulate the first data traffic and the second data traffic into a single data packet; and a user defined tunnel to communicate the single data packet to a cloud-based server in a protocol compatible with a cloud-based firewall, wherein the single data packet is communicated to the cloud-based server through one of a TLS-over-TCP connection or HTTP connection.

17. The gateway device of claim 16, wherein the first client is an Open VPN client and the second client is a Simple Connect client.

18. The gateway device of claim 16, wherein the protocol compatible with the cloud-based firewall is a TLS protocol.

19. The gateway device of claim 16, wherein the user defined tunnel is an OpenVPN tunnel.

20. The gateway device of claim 16, wherein an IP address of the single data packet is modified using a network address translation (NAT).

\* \* \* \* \*